United States Patent
Sanderovich et al.

(10) Patent No.: US 10,727,994 B2
(45) Date of Patent: Jul. 28, 2020

(54) USING SEQUENCES OF PILOT REPETITIONS FOR RECEIVER ADAPTATION

(71) Applicant: QUALCOMM Incorporated, San Diego, CA (US)

(72) Inventors: Amichai Sanderovich, Atlit (IL); Assaf Yaakov Kasher, Haifa (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/864,701

(22) Filed: Jan. 8, 2018

(65) Prior Publication Data

US 2018/0198584 A1 Jul. 12, 2018

Related U.S. Application Data

(60) Provisional application No. 62/444,165, filed on Jan. 9, 2017.

(51) Int. Cl.
*H04L 5/00* (2006.01)
*H04B 17/354* (2015.01)
(Continued)

(52) U.S. Cl.
CPC ......... *H04L 5/0048* (2013.01); *H04B 17/336* (2015.01); *H04B 17/354* (2015.01);
(Continued)

(58) Field of Classification Search
CPC . H04L 5/0048; H04L 27/2613; H04B 17/336; H04B 17/354; H04B 7/0413; H04W 84/12

See application file for complete search history.

(56) References Cited

U.S. PATENT DOCUMENTS 4,251,886 A * 2/1981 Roza ................. H04L 25/03127
375/290
7,715,135 B1 * 5/2010 Sutardja ............... G11B 5/6005
360/40

(Continued)

FOREIGN PATENT DOCUMENTS

EP 2131519 A1 12/2009

OTHER PUBLICATIONS

Cordeiro C., (Intel): "Specification Framework for Tgay; 11-15-1358-02-00ay-specification-framework-for-tgay", IEEE Draft, vol. 802.11 ay, No. 2, Jan. 28, 2016, XP068104703, pp. 1-6.

(Continued)

*Primary Examiner* — Hoang-Chuong Q Vu
(74) *Attorney, Agent, or Firm* — Steven R. Thiel; Loza & Loza LLP

(57) ABSTRACT

Receive operations at a receiver may be improved by performing one or more estimations before receiving data. For example, the time between the end of the header transmission and the start of the data transmission may be used to send patterns to be used for an estimation. In some implementations, sequences of pilot repetitions may be used to adapt the operation of a receiver. In some implementations, short training fields may be used to adapt the operation of a receiver.

29 Claims, 23 Drawing Sheets

(51) Int. Cl.
*H04B 17/336* (2015.01)
*H04L 27/26* (2006.01)
*H04B 7/0413* (2017.01)
*H04W 84/12* (2009.01)

(52) U.S. Cl.
CPC ........ *H04L 27/2613* (2013.01); *H04B 7/0413* (2013.01); *H04L 5/0023* (2013.01); *H04W 84/12* (2013.01)

(56) References Cited

U.S. PATENT DOCUMENTS

| | | | | |
|---|---|---|---|---|
| 8,498,368 | B1* | 7/2013 | Husted | H03G 3/3052 |
| | | | | 375/316 |
| 2002/0012343 | A1* | 1/2002 | Holloway | H04L 1/0003 |
| | | | | 370/389 |
| 2008/0037680 | A1* | 2/2008 | Sakata | H04B 7/0613 |
| | | | | 375/267 |
| 2010/0115375 | A1* | 5/2010 | Shen | H03M 13/1102 |
| | | | | 714/758 |
| 2011/0194545 | A1* | 8/2011 | Yang | H04L 5/0023 |
| | | | | 370/338 |
| 2011/0207457 | A1* | 8/2011 | Nagata | H04J 11/0069 |
| | | | | 455/434 |
| 2012/0213095 | A1* | 8/2012 | Krishnamurthy | H04L 5/001 |
| | | | | 370/252 |
| 2013/0176872 | A1* | 7/2013 | Stanczak | H04L 1/02 |
| | | | | 370/252 |
| 2016/0087766 | A1 | 3/2016 | Sun et al. | |
| 2017/0078008 | A1* | 3/2017 | Kasher | H04B 7/0617 |
| 2017/0099125 | A1* | 4/2017 | Bengtsson | H04L 1/1671 |
| 2017/0111099 | A1* | 4/2017 | Jo | H04B 7/0684 |
| 2018/0262366 | A1* | 9/2018 | Sahin | H04B 7/0452 |

OTHER PUBLICATIONS

International Search Report and Written Opinion—PCT/US2018/012895—ISA/EPO—dated Jun. 1, 2018.

* cited by examiner

USING SEQUENCES OF PILOT REPETITIONS FOR RECEIVER ADAPTATION

CROSS-REFERENCE TO RELATED APPLICATION(S)

This application claims priority to and the benefit of provisional patent application No. 62/444,165 filed in the U.S. Patent and Trademark Office on Jan. 9, 2017, the entire content of which is incorporated herein by reference.

INTRODUCTION

Various aspects described herein relate to wireless communication and, more particularly but not exclusively, to communication using sequences of pilot repetitions to adapt the operation of a receiver.

Some types of wireless communication devices employ multiple antennas to provide a higher level of performance as compared to devices that use a single antenna. For example, a wireless multiple-in-multiple-out (MIMO) system (e.g., a wireless local area network (WLAN) that supports IEEE 802.11ax) may use multiple transmit antennas to provide beamforming-based signal transmission. Typically, beamforming-based signals transmitted from different antennas are adjusted in phase (and optionally amplitude) such that the resulting signal power is focused toward a receiver device (e.g., an access terminal).

A wireless MIMO system may support communication for a single user at a time or for several users concurrently. Transmissions to a single user (e.g., a single receiver device) are commonly referred to as single-user MIMO (SU-MIMO), while concurrent transmissions to multiple users are commonly referred to as multi-user MIMO (MU-MIMO).

An access point (e.g., a base station) of a MIMO system employs multiple antennas for data transmission and reception, while each user employs one or more antennas. The access point communicates with the users via forward link channels and reverse link channels. In some aspects, a forward link (or downlink) channel refers to a communication channel from a transmit antenna of the access point to a receive antenna of a user, and a reverse link (or uplink) channel refers to a communication channel from a transmit antenna of a user to a receive antenna of the access point.

MIMO channels corresponding to transmissions from a set of transmit antennas to a receive antenna are referred to spatial streams since precoding (e.g., beamforming) is employed to direct the transmissions toward the receive antenna. Consequently, in some aspects each spatial stream corresponds to at least one dimension. A MIMO system thus provides improved performance (e.g., higher throughput and/or greater reliability) through the use of the additional dimensionalities provided by these spatial streams.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides an apparatus configured for communication. The apparatus includes: an interface configured to obtain a sequence that includes pilot repetitions; and a processing system configured to: modify the sequence to provide a modified sequence, and generate a frame that includes the modified sequence, wherein the interface is further configured to output the frame for transmission. In some implementations, separate interfaces could be used to obtain the sequence and to output the frame.

In some aspects, the disclosure provides a method of communication. The method includes: obtaining a sequence that includes pilot repetitions; modifying the sequence to provide a modified sequence; generating a frame that includes the modified sequence; and outputting the frame for transmission.

In some aspects, the disclosure provides an apparatus configured for communication. The apparatus includes: means for obtaining a sequence that includes pilot repetitions; means for modifying the sequence to provide a modified sequence; means for generating a frame that includes the modified sequence; and means for outputting the frame for transmission.

In some aspects, the disclosure provides a wireless node. The wireless node includes: an interface configured to obtain a sequence that includes pilot repetitions; a processing system configured to: modify the sequence to provide a modified sequence, and generate a frame that includes the modified sequence; and a transmitter configured to transmit the frame.

In some aspects, the disclosure provides a computer-readable medium (e.g., a non-transitory computer-readable medium) storing computer-executable code. The computer-readable medium includes code to: obtain a sequence that includes pilot repetitions; modify the sequence to provide a modified sequence; generate a frame that includes the modified sequence; and output the frame for transmission.

In some aspects, the disclosure provides an apparatus configured for communication. The apparatus includes: an interface configured to obtain a frame that includes a sequence including pilot repetitions; and a processing system configured to: process the sequence to determine at least one communication parameter, and generate a signal to control an operation based on the at least one communication parameter, wherein the interface is further configured to output the signal. In some implementations, separate interfaces could be used to obtain the frame and to output the signal.

In some aspects, the disclosure provides a method of communication. The method includes: obtaining a frame that includes a sequence including pilot repetitions; processing the sequence to determine at least one communication parameter; generating a signal to control an operation based on the at least one communication parameter; and outputting the signal.

In some aspects, the disclosure provides an apparatus configured for communication. The apparatus includes: means for obtaining a frame that includes a sequence including pilot repetitions; means for processing the sequence to determine at least one communication parameter; means for generating a signal to control an operation based on the at least one communication parameter; and means for outputting the signal.

In some aspects, the disclosure provides a wireless node. The wireless node includes: a receiver configured to receive a frame that includes a sequence including pilot repetitions; a processing system configured to: process the sequence to determine at least one communication parameter; and generate a signal to control an operation based on the at least one communication parameter; and an interface configured to output the signal to the receiver.

In some aspects, the disclosure provides a computer-readable medium (e.g., a non-transitory computer-readable medium) storing computer-executable code. The computer-readable medium includes code to: obtain a frame that includes a sequence including pilot repetitions; process the sequence to determine at least one communication parameter; generate a signal to control an operation based on the at least one communication parameter; and output the control signal.

In some aspects, the disclosure provides an apparatus configured for communication. The apparatus includes: an interface configured to obtain a sequence that includes pilot repetitions; and a processing system configured to: high-pass filter at least one pilot repetition of the sequence to provide a modified sequence, and generate a frame with a field that includes the modified sequence, wherein the interface is further configured to output the frame for transmission. In some implementations, separate interfaces could be used to obtain the sequence and to output the frame.

In some aspects, the disclosure provides a method of communication. The method includes: obtaining a sequence that includes pilot repetitions; high-pass filtering at least one pilot repetition of the sequence to provide a modified sequence; generating a frame with a field that includes the modified sequence; and outputting the frame for transmission.

In some aspects, the disclosure provides an apparatus configured for communication. The apparatus includes: means for obtaining a sequence that includes pilot repetitions; means for high-pass filtering at least one pilot repetition of the sequence to provide a modified sequence; means for generating a frame with a field that includes the modified sequence; and means for outputting the frame for transmission.

In some aspects, the disclosure provides a wireless node. The wireless node includes: an interface configured to obtain a sequence that includes pilot repetitions; and a processing system configured to: high-pass filter at least one pilot repetition of the sequence to provide a modified sequence, and generate a frame with a field that includes the modified sequence; and a transmitter configured to transmit the frame.

In some aspects, the disclosure provides a computer-readable medium (e.g., a non-transitory computer-readable medium) storing computer-executable code. The computer-readable medium includes code to: obtain a sequence that includes pilot repetitions; high-pass filter at least one pilot repetition of the sequence to provide a modified sequence; generate a frame with a field that includes the modified sequence; and output the frame for transmission.

In some aspects, the disclosure provides an apparatus configured for communication. The apparatus includes: an interface configured to obtain a frame including a sequence that includes pilot repetitions; and a processing system configured to: process the sequence to determine leakage associated with transmission of the frame, and generate a signal to control a receive operation based on the leakage, wherein the interface is further configured to output the signal. In some implementations, separate interfaces could be used to obtain the frame and to output the signal.

In some aspects, the disclosure provides a method of communication. The method includes: obtaining a frame including a sequence that includes pilot repetitions; processing the sequence to determine leakage associated with transmission of the frame; generating a signal to control a receive operation based on the leakage; and outputting the signal.

In some aspects, the disclosure provides an apparatus configured for communication. The apparatus includes: means for obtaining a frame including a sequence that includes pilot repetitions; means for processing the sequence to determine leakage associated with transmission of the frame; means for generating a signal to control a receive operation based on the leakage; and means for outputting the signal.

In some aspects, the disclosure provides a wireless node. The wireless node includes: a receiver configured to receive a frame including a sequence that includes pilot repetitions; a processing system configured to: process the sequence to determine leakage associated with transmission of the frame, and generate a signal to control a receive operation based on the leakage; and an interface configured to output the signal to the receiver.

In some aspects, the disclosure provides a computer-readable medium (e.g., a non-transitory computer-readable medium) storing computer-executable code. The computer-readable medium includes code to: obtain a frame including a sequence that includes pilot repetitions; process the sequence to determine leakage associated with transmission of the frame; generate a signal to control a receive operation based on the leakage; and output the signal.

In some aspects, the disclosure provides an apparatus configured for communication. The apparatus includes: an interface configured to obtain a frame including a sequence that includes pilot repetitions; and a processing system configured to: process the sequence to determine phase noise associated with transmission of the frame, and generate a signal to control a receive operation based on the phase noise, wherein the interface is further configured to output the signal. In some implementations, separate interfaces could be used to obtain the frame and to output the signal.

In some aspects, the disclosure provides a method of communication. The method includes: obtaining a frame including a sequence that includes pilot repetitions; processing the sequence to determine phase noise associated with transmission of the frame, generating a signal to control a receive operation based on the phase noise; and outputting the signal.

In some aspects, the disclosure provides an apparatus configured for communication. The apparatus includes: means for obtaining a frame including a sequence that includes pilot repetitions; means for processing the sequence to determine phase noise associated with transmission of the frame, means for generating a signal to control a receive operation based on the phase noise; and means for outputting the signal.

In some aspects, the disclosure provides a wireless node. The wireless node includes: a receiver configured to receive a frame including a sequence that includes pilot repetitions; a processing system configured to: process the sequence to determine phase noise associated with transmission of the frame, and generate a signal to control a receive operation based on the phase noise; and an interface configured to output the signal to the receiver.

In some aspects, the disclosure provides a computer-readable medium (e.g., a non-transitory computer-readable medium) storing computer-executable code. The computer-readable medium includes code to: obtain a frame including a sequence that includes pilot repetitions; process the sequence to determine phase noise associated with transmission of the frame; generate a signal to control a receive operation based on the phase noise; and output the signal.

In some aspects, the disclosure provides an apparatus configured for communication. The apparatus includes: an interface configured to obtain a frame including a sequence that includes pilot repetitions; and a processing system configured to: process the sequence to determine noise or interference associated with transmission of the frame, and generate a signal to control a receive operation based on the noise or interference, wherein the interface is further configured to output the signal.

In some aspects, the disclosure provides a method of communication. The method includes: obtaining a frame including a sequence that includes pilot repetitions; processing the sequence to determine noise or interference associated with transmission of the frame; generating a signal to control a receive operation based on the noise or interference; and outputting the signal. In some implementations, separate interfaces could be used to obtain the frame and to output the signal.

In some aspects, the disclosure provides an apparatus configured for communication. The apparatus includes: means for obtaining a frame including a sequence that includes pilot repetitions; means for processing the sequence to determine noise or interference associated with transmission of the frame; means for generating a signal to control a receive operation based on the noise or interference; and means for outputting the signal.

In some aspects, the disclosure provides a wireless node. The wireless node includes: a receiver configured to receive a frame including a sequence that includes pilot repetitions; a processing system configured to: process the sequence to determine noise or interference associated with transmission of the frame, and generate a signal to control a receive operation based on the noise or interference; and an interface configured to output the signal to the receiver.

In some aspects, the disclosure provides a computer-readable medium (e.g., a non-transitory computer-readable medium) storing computer-executable code. The computer-readable medium includes code to: obtain a frame including a sequence that includes pilot repetitions; process the sequence to determine noise or interference associated with transmission of the frame; generate a signal to control a receive operation based on the noise or interference; and output the signal.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may include at least one element of a claim. For example, a method of communication may include obtaining a sequence that includes pilot repetitions; modifying the sequence to provide a modified sequence; generating a frame that includes the modified sequence; and outputting the frame for transmission.

In next generation standards such as IEEE 802.11ay there is a requirement to fill the time between sending a frame header and sending the frame data for channel bonding (CB) or MIMO. This time is required for the receiver to decode the header in time to decode the data.

The disclosure relates in some aspects to improving data reception by performing one or more estimations before receiving data. For example, the time between the end of the header transmission and the start of the data transmission may be used to send patterns to be used for various estimations. In some implementations, fields such as short training (STF) fields may be used for this estimation. These estimations may advantageously reduce (e.g., eliminate) the need for equalization, decimation, or frequency correction at the receiver.

Figure 1:
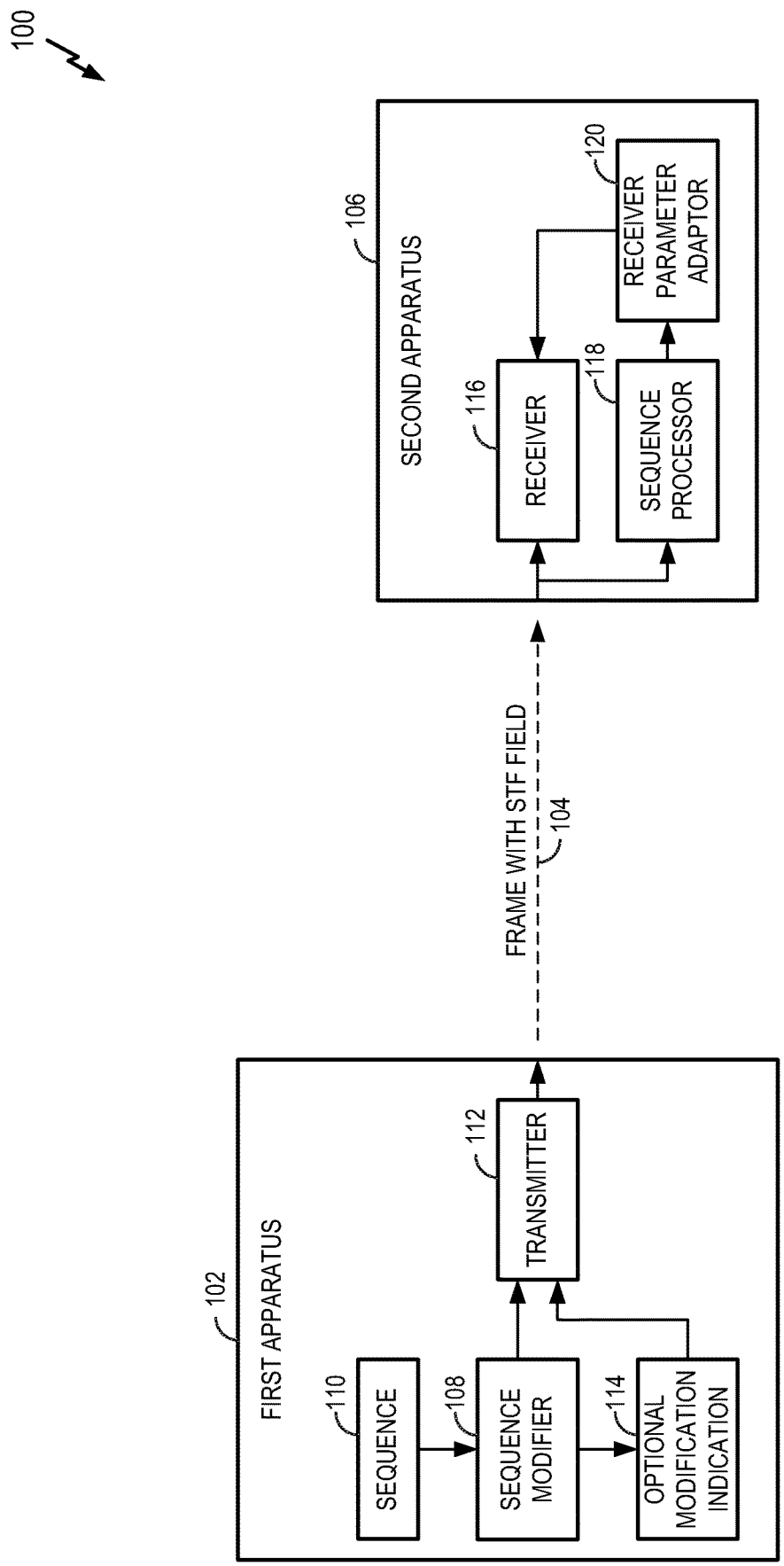
FIG. 1 illustrates an example of transmitting and receiving devices in accordance with some aspects of the disclosure.

FIG. 1 illustrates a wireless communication system 100 where a first apparatus 102 sends a frame 104 with a short training field (STF) to a second apparatus 106. In an example implementation, the frame may be an IEEE 802.11ay frame and the STF may be an extended directional multi-gigabit short training field (EDMG-STF).

Conventionally, the EDMG-STF allows a receiver to recover new timing before an EDMG channel estimation field (EDMG-CEF) arrives, and provides time for the receiver to decode the legacy header (L-Header) and the EDMG header before starting to process the wideband channel. For example, the headers should be decoded before the EDMG-CEF arrives so that the receiver will know whether it needs to decode a high bandwidth channel (e.g., and therefore switch from a narrowband receiver to a wideband receiver).

The disclosure relates in some aspects to using transmissions during the STF to improve receiver performance. Advantageously, these techniques don't require use of a wideband receiver. For example, gain and linearity can be estimated (e.g., by measuring the received signal strength indication, RSSI) without using the full bandwidth of a channel. Accordingly, less complex hardware may be used for the estimation. As another example, a receiver can estimate the direct current (DC) and local oscillator (LO) leakage based on a band-limited STF. Thus, the receiver can estimate these values before knowing whether the wideband channel will be used. If it turns out that a wideband channel is being used, the receiver can use the estimates to improve receive performance. If it turns out that a wideband channel is not being used, the receiver can just discard the estimates, with little or no performance loss.

In FIG. 1, the first apparatus 102 may modify a sequence of pilot repetitions in the STF (e.g., in terms of gain or by applying a high pass filter) before sending the frame 104. To this end, the first apparatus 102 includes a sequence modifier 108 that is configured to modify a sequence 110. A transmitter 112 may send the modified sequence (or, optionally, the unmodified sequence 110) to the second apparatus via the frame 104. In addition, in some implementations, the transmitter 112 sends an indication 114 of the modification of the sequence to the second apparatus 106 (e.g., via the frame 104 or in some other manner). The indication 114 may indicate, for example, support for modification of a sequence, the type of sequence modification, a gain applied to a sequence, a characteristic of a filter applied to a sequence, the length of the modified sequence, some other characteristic of a sequence, or any combination thereof.

The second apparatus 106 uses the sequence in the STF to adapt operations of its receiver 116. For example, after the receiver 116 of the second apparatus 106 receives the frame 104, a sequence processor 118 may estimate, based on the STF of the frame 104, one or more of gain, linearity, direct current (DC) leakage, local oscillator (LO) leakage, phase noise, noise, or interference. A parameter adaptor 120 may then adapt one or more operations of the receiver 116 based on this estimation. Advantageously, the second apparatus 106 may process the STF while the receiver 116 is processing a header of the frame 104.

Example Frame Structure

Figure 2:
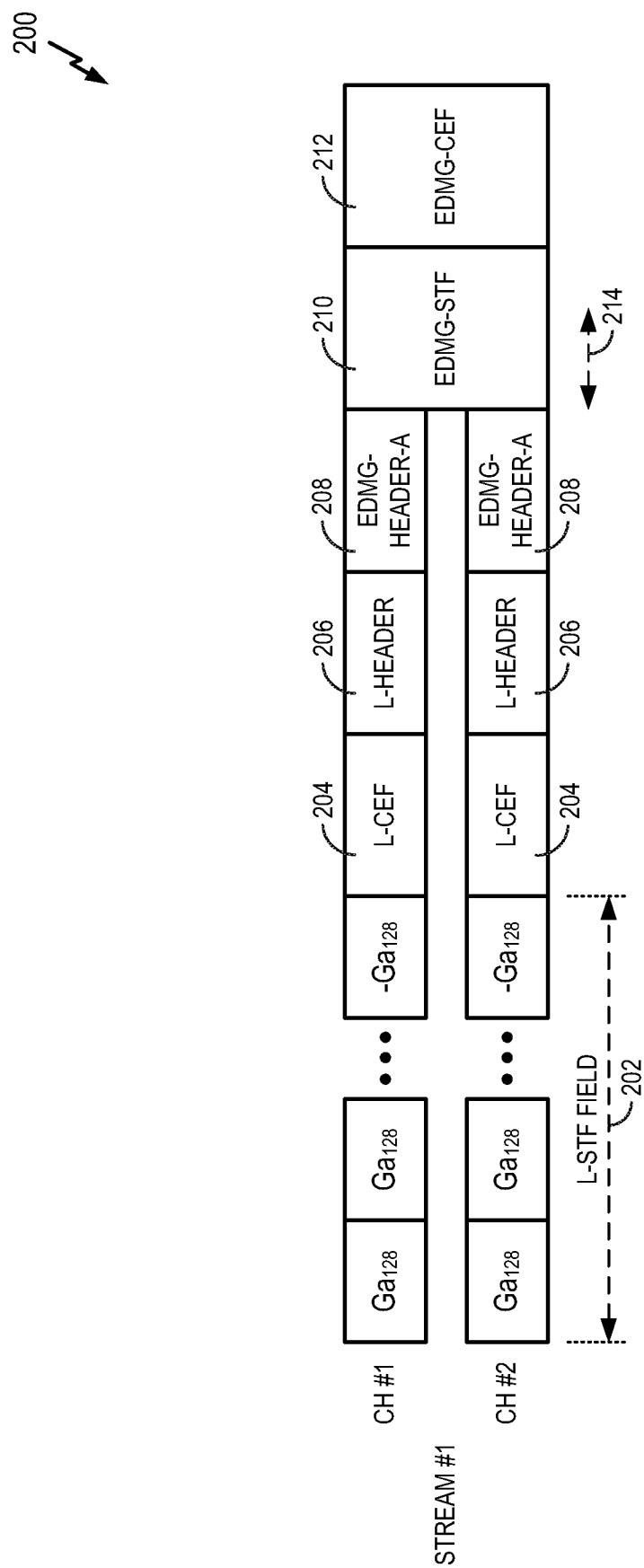
FIG. 2 illustrates an example of a wireless communication frame with which aspects of the present disclosure may be employed.

FIG. 2 illustrates an example of a frame preamble 200 that may be applicable to IEEE 802.11ay communication or some other type of wireless communication. The frame preamble 200 (e.g., for a channel bonding scenario) includes a legacy short training field (L-STF) 202, a legacy channel estimation field (L-CEF) 204, a legacy header (L-HEADER) 206, a EDMG header (EDMG-HEADER-A) 208, an EDMG-STF 210, and an EDMG-CEF 212. Data fields (not shown) would follow the frame preamble 200 and are transmitted across all bands in the channel bonding scenario. In accordance with the teachings herein, all or a portion of a sequence of pilot repetitions defined for the EDMG-STF may be used to adapt the operation of a receiver. For example, a first part 214 of the EDMG-STF may be used for this purpose in some implementations. The particular frame preamble 200 shown in FIG. 2 is for illustration purposes only. Other types of frame preambles and/or frames may be used in other implementations.

Example STFs

Figure 3:
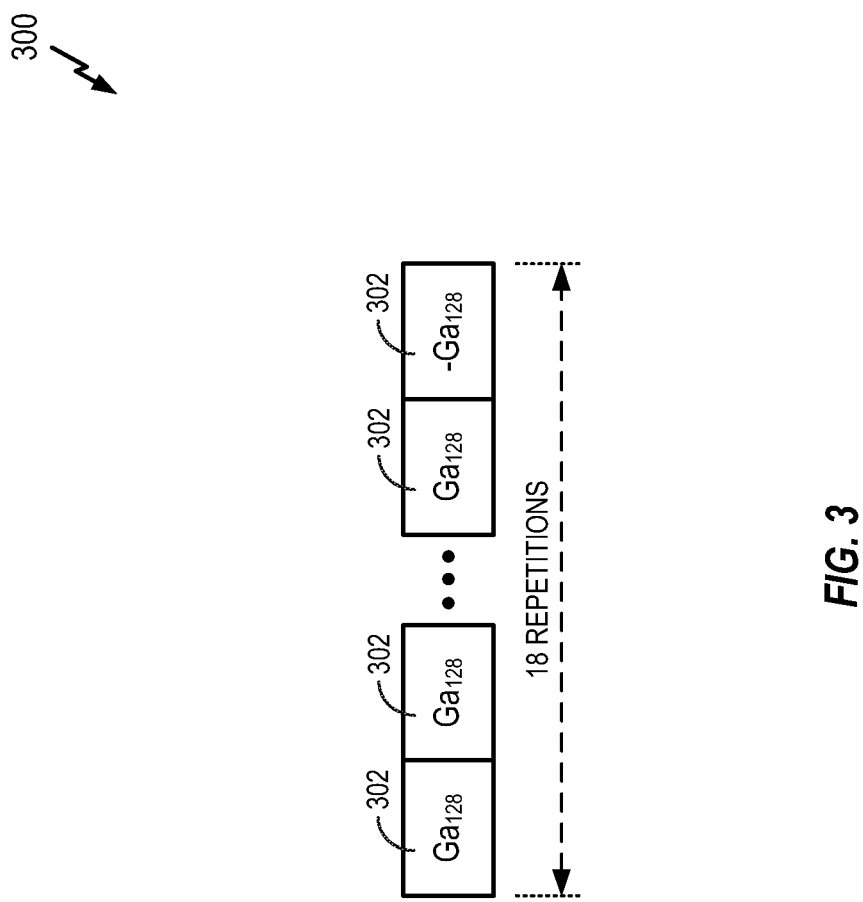
FIG. 3 illustrates an example of a wireless communication sequence with which aspects of the present disclosure may be employed.

FIG. 3 illustrates an example of an STF sequence 300 for the frame preamble 200 of FIG. 2. As indicated, the STF sequence 300 includes a series of pilot repetitions Ga 302. In this example, each pilot repetition Ga 302 includes 128 symbols. A different number of symbols may be used in other STF sequences.

Other Example Frame Structures

Figure 4:
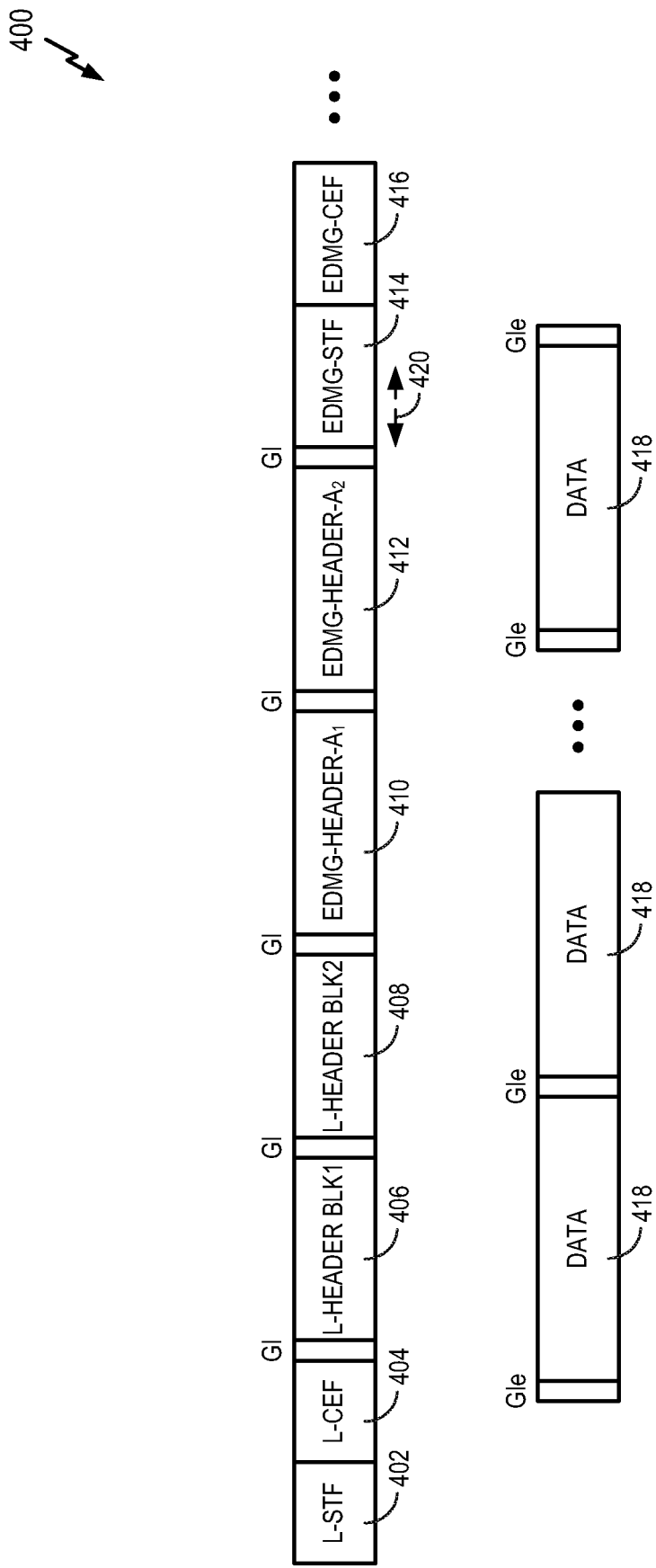
FIG. 4 illustrates an example of a wireless communication frame for single-input single-output (SISO) transmission with which aspects of the present disclosure may be employed.

FIG. 4 illustrates an example of a frame 400 that may be applicable to IEEE 802.11ay single-input single-output (SISO) communication or some other type of wireless communication. The frame 400 includes an L-STF 402, an L-CEF 404, two blocks of a legacy header (L-HEADER BLK1 406 and L-HEADER BLK2 408), two blocks of an EDMG header (EDMG-HEADER-A$_1$ 410 and EDMG-HEADER-A$_2$ 412), an EDMG-STF 414, an EDMG-CEF 416, and data fields 418. The frame 400 also includes guard intervals (designated "GI" in FIG. 4) and EDMG GIs (designated "GIe" in FIG. 4). The number of symbols in each guard interval may differ in different implementations. For example, the size of a GIe may depend on the number of channels (NCB) that make up the signal bandwidth of an EDMG PPDU. In accordance with the teachings herein, all or a portion of a sequence of pilot repetitions defined for the EDMG-STF may be used to adapt the operation of a receiver. For example, a first part 420 of the EDMG-STF may be used for this purpose in some implementations. The frame 400 shown in FIG. 4 is for illustration purposes only. Other types of frames may be used in other implementations. For example, while the frame 400 is illustrated for single carrier (SC) operation, it could be extended to orthogonal frequency division multiplexing (OFDM) operation. In this case, some fields (after the EDMG-CEF) may have different names (e.g., cyclic prefix (CP) instead of GI) and the data blocks may have different lengths.

Figure 5:
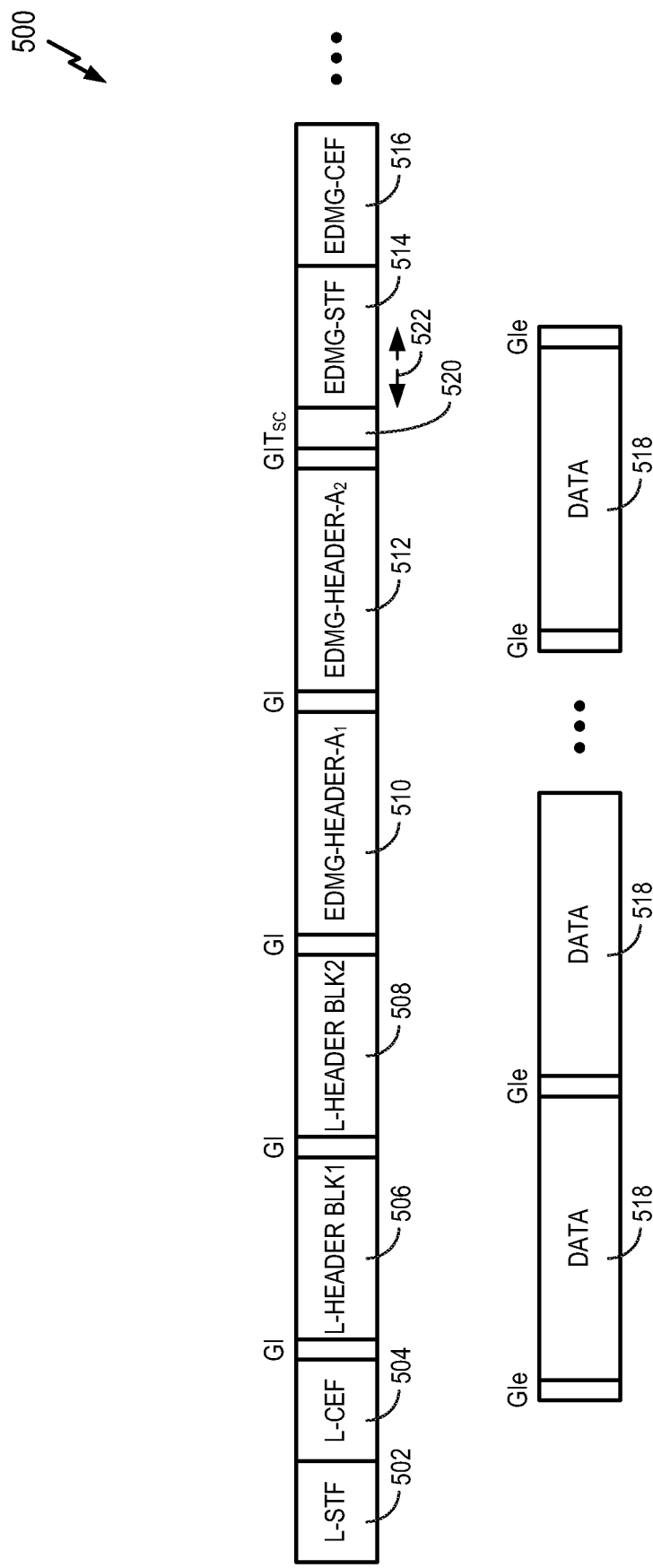
FIG. 5 illustrates an example of a wireless communication frame for MIMO transmission with which aspects of the present disclosure may be employed.

FIG. 5 illustrates an example of a frame 500 that may be applicable to IEEE 802.11ay multiple-input multiple-output (MIMO) communication or some other type of wireless communication. The frame 500 includes an L-STF 502, an L-CEF 504, two blocks of a legacy header (L-HEADER BLK1 506 and L-HEADER BLK2 508), two blocks of an EDMG header (EDMG-HEADER-A$_1$ 510 and EDMG-HEADER-A$_2$ 512), an EDMG-STF 514, an EDMG-CEF 516, and data fields 518. The frame 400 includes guard intervals (designated "GI" in FIG. 4) and EDMG GIs (designated "GIe" in FIG. 4), and another interval T$_{SC}$ 520. The number of symbols in each guard interval may differ in different implementations. The number of symbols in T$_{SC}$ 520 may differ in different implementations (e.g., the size of T$_{SC}$ 520 may depend on a chip time duration (T$_C$) and/or the number (N$_C$) of single carrier (SC) chips). In accordance with the teachings herein, all or a portion of a sequence of pilot repetitions defined for the EDMG-STF may be used to adapt the operation of a receiver. For example, a first part 522 of the EDMG-STF may be used for this purpose in some implementations. The frame 500 shown in FIG. 5 is for illustration purposes only. Other types of frames may be used in other implementations.

The L-Headers and EDMG headers shown above may incorporate robust modulation schemes to allow receivers on the coverage edge to correctly receive and demodulate the information contained in the headers. The L-Header may, for example, be a header defined previously in a separate standard, such as IEEE 802.11ad. In some cases, the L-Header may be binary phase shift keying (BPSK) modulated and include rotation support. BPSK modulation may incorporate two phases, separated by 180 degrees such that the exact positioning of the constellation points does not particularly matter. The information encoded by such a signal is based on the phase, and the signal has a low peak to average power ratio (PAPR). The EDMG header may, for example, be quadrature phase shift keying (QPSK) modulated. QPSK modulation may incorporate four phases on a constellation diagram equally spaced around a circle. Information encoded by QPSK modulation may also be based on the phase and the signal also has a low PAPR.

The legacy fields may include one or more bits that signal that the EDMG Header-A is present. For example, these bits may describe the payload, the bandwidth, and the MIMO order (if applicable).

Device Support for Receiver Adaptation

Devices (e.g., stations) might or might not signal support for receiver adaptation to other devices. For example, in some implementations, support may be specified by a standard. In this case, all devices that support the standard may support receiver adaptation as taught herein. Thus, in this case, the device need not signal support for this adaptation.

In some implementations, devices may negotiate to determine whether the devices support receiver adaptation as taught herein. For example, two stations in communication may negotiate (e.g., after association) one or more of the following. The stations may negotiate support for receiver adaptation as taught herein (e.g., for each direction of communication). The stations may negotiate the length of the portion to be used (e.g., relative to the entire EDMG-STF length which may be fixed as defined by a standard). In some implementations, the length may be defined in units of 128 samples at 1.76 Gsps (e.g., denoted in units of K). In some implementations, the parameter K scales according to the channel bandwidth (CB). The stations may negotiate the type of signal to be used (e.g., in the EDMG-STF). In some implementations, the signal may include a mixture of the types taught herein (e.g., for estimating gain, linearity, DC/LO leakage, phase noise, noise, interference, or any combination thereof).

Figure 6:
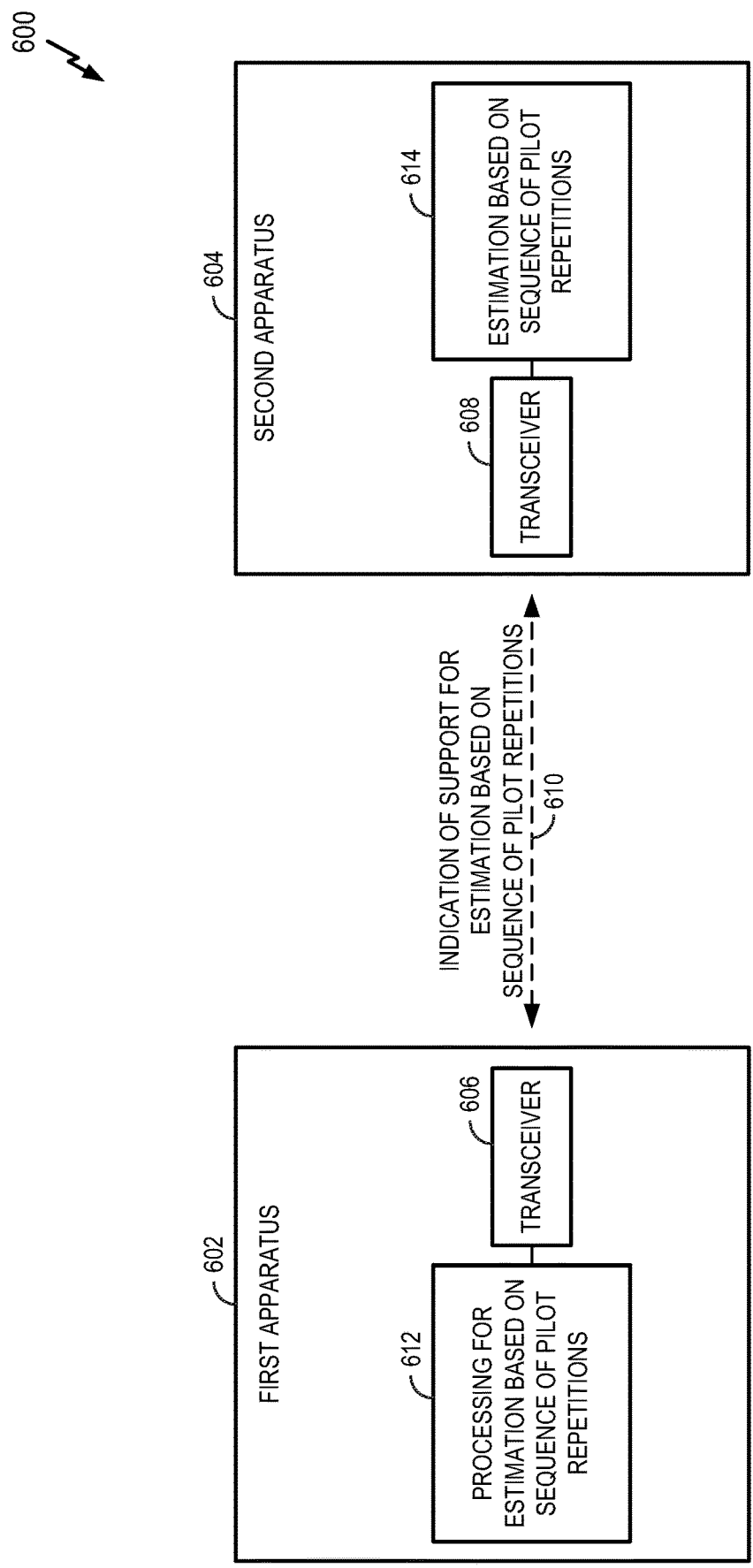
FIG. 6 illustrates another example of transmitting and receiving devices in accordance with some aspects of the disclosure.

FIG. 6 illustrates a wireless communication system 600 where a first apparatus 602 negotiates with a second apparatus 604 via respective transceivers 606 and 608 to indicate 610 support for estimation based on a sequence of pilot repetitions (e.g., carried by an EDMG-STF). Here, the first apparatus 602 may perform processing for estimation based on a sequence of pilot repetitions 612 (e.g., by adjusting the gain of a sequence or applying high pass filtering to the sequence), while the second apparatus 604 may perform estimation based on a sequence of pilot repetitions 614 (e.g., adjusting one or more receiver parameters based on processing of a received sequence). Either or both of the first apparatus 602 or the second apparatus 604 may send an indication to the other device indicating that estimation based on a sequence of pilot repetitions is supported. In some cases, the indication may indicate support for modification of a sequence, that the sequence will be or has been modified, the type of sequence modification, a gain applied to a sequence, a characteristic of a filter applied to a sequence, the length of the modified sequence, some other characteristic of a sequence, or any combination thereof. Accordingly, upon receiving such an indication, the receiving device may perform its estimation-related operations accordingly. For example, the processing for estimation based on a sequence of pilot repetitions 612 may modify a sequence in a manner consistent with the indication. Similarly, the estimation based on a sequence of pilot repetitions 614 may be performed in a manner consistent with the indication.

Devices may negotiate in various ways. In some implementations, negotiation involves negotiating support for this estimation and/or one or more parameters used for the estimation. In some implementations, the devices may use information elements (IEs) and an association process to negotiate. In some implementations, the EDMG Header-A may signal (e.g., via one or more bits) one or more of: the presence of a modification of the EDMG-STF for estimation purposes, the length (e.g., value of K) of the signal, or the type of signal being used.

Re-Using the STF Field

The disclosure relates in some aspects to reusing at least a portion of an STF field (e.g., the first part of an EDMG-STF field) for efficient communication. For example, the time starting after the end of the GI after the last EDMG Header-A symbols may be used to send patterns to be used for various estimations. The signal sent via the STF field (e.g., the pattern) may be any combination of the signals that can be used for non-linearity estimation, DC/LO leakage estimation, phase noise estimation, or noise/interference estimation. In one example implementation (e.g., that uses a channel bandwidth of 1.76 giga-samples per second (Gsps)), the first 1024 samples may be used to send patterns for the estimations. These estimations may advantageously reduce (e.g., eliminate) the need for equalization, decimation, or frequency correction at the receiver.

Estimating Gain and Linearity

The disclosure relates in some aspects to estimating gain and linearity. For example, by using sequences with several energies, a receiver is able to estimate the linearity of the payload ahead of time (e.g., before some or all of the payload arrives at the receiver). Advance estimation of this linearity may be advantageous, for example, for SC high order QAM or OFDM.

High levels of linearity and associated lower levels of distortion at high output power could be achieved through careful calibration, pre-distortion and adaptive predistortion, or high backoff levels. However, these techniques may be associated with higher costs due to factory calibration requirements, additional or more costly hardware and power, or reduced power levels. In accordance with the teachings herein, the disclosure relates in some aspects to non-linearity estimation based on an amplitude modulation of a phase modulated header. The techniques may be applied, for example, to any type of wireless device utilizing orthogonal frequency division multiplexing (OFDM) and/or single carrier (SC) modulation, such as 802.11ad devices and 802.11ay devices.

As discussed above, a field of a frame (e.g., the first part of an EDMG-STF) may include a signal that is defined to enable a receiver to estimate gain and linearity. Several types of signals could be used. In some implementations, the length of the signal (e.g., the portion of the sequence used for estimation) may be K times 128 samples (e.g., at 1.76 Gsps).

In some implementations, the signal takes the form of a staircase. For example, the signal may be the same as a standard EDMG-STF (pi/2 rotated BPSK Golays) but with M different amplitude values. In some implementations, the amplitude value may be changed every $$\left\lfloor \frac{N \cdot 128}{M} \right\rfloor$$

samples at 1.76 Gsps (scales with CB). The M different values may be set by a defined list. As one example, M=8, with values (0.75, 1.0, 1.25, 1.5, 1.75, 2.0, 2.25, 2.5), where 1 is the nominal power. Other values may be used. In some implementations, the amplitude value may be changed for every pilot repetition (e.g., every Ga may be sent at a different power level) or at other intervals.

In some implementations, the signal takes the form of an amplitude slope (e.g., a dual slope). For example, the signal may be the same as a standard EDMG-STF (pi/2 rotated BPSK Golays) but with amplitude variation using a linear interpolation between a1 and a2 for the first half of the portion used for estimation-related signaling, followed by an amplitude variation using a linear interpolation between a2 and a1 for the second half of the portion. In some implementations, the value for a1 is 0.5 and the value for a2 is 2.5. Other values may be used.

In some implementations, the signal takes the form of a power slope (e.g., a dual slope). For example, the signal may be the same as a standard EDMG-STF (pi/2 rotated BPSK Golays) but with amplitude variation using the square root of a linear interpolation between p1 and p2 for the first half of the portion used for estimation-related signaling, followed by an amplitude variation using the square root of a linear interpolation between p2 and p1 for the second half of the portion. In some implementations, the value for p1 is 0.25 and the value for p2 is 6. Other values may be used.

In view of the above, the disclosure relates in some aspects to communicating a frame having at least a first header that is phase modulated and to performing amplitude modulation of the first header during transmission prior to amplification via a power amplifier. For example, a first device may generate a frame having at least a first header that is phase modulated, perform amplitude modulation on the first header prior to amplification by a power amplifier, and send the frame to a second device. The second device may thus obtain a frame having at least a first header that is phase modulated, estimate a transfer function based on information regarding amplitude modulation of the first header, and process the remaining portion of the frame (e.g., the data) based on the estimated transfer function. For example, a de-mapper may use the different gains to obtain a better estimate of the compression of the received signal, and thereby compensate for the compression. Thus, advantageously, while the receiver is decoding the headers, relatively simple hardware can be used to concurrently estimate the non-linearity. The performance of the receiver may thereby be quickly adapted to better receive subsequent information in the frame.

The header may incorporate a variety of signal amplitudes to allow an estimation of a power amplifier's linearity by a transmitter or receiver. This estimation may be based on a comparison of the received and measured amplitude modulation against an expected amplitude modulation, based on a predefined pattern known at the receiver. In some cases, the receiver may obtain information regarding the predefined pattern (e.g., in the frame to which the amplitude modulation was applied or a previous frame). In some cases, the predefined pattern for amplitude modulation may be defined, for example, in a standard. The predefined pattern may be incorporated without changing the phase modulation and might have little to no impact on existing demodulation of the header. For example, a wireless node capable of processing the amplitude modulation could find the amplitude modulation pattern decodable along with the existing phase modulated portions. Other wireless nodes which do not support processing amplitude modulation will still be able to decode the phase modulated portions. The transmitter or receiver may then compensate for the estimated non-linearity to improve the performance of the receiver without any further information exchanges. Additional information exchanges between the transmitter and receiver, while not necessary, may also be provided (e.g., to identify a particular pattern used at the transmit-side for amplitude modulation). The predefined pattern may include amplitudes that vary from a nominal amplitude value based on the average power.

For example, the predefined pattern may include amplitudes that are lower or higher than the nominal amplitude value. The predefined pattern may also include smooth transitions relative to implementations without amplitude modulation, and may be designed to avoid influencing other parameters, such as out of band emission artifacts.

Estimating DC Leakage or LO Leakage

The disclosure relates in some aspects to estimating DC/LO leakage by sending only high frequency content, and avoid sending energy around the DC. By using high pass filtered sequences, a receiver is able to estimate the DC/LO leakage associated with the payload ahead of time (e.g., before some or all of the payload arrives at the receiver).

As discussed above, a field of a frame (e.g., the first part of an EDMG-STF) may include a signal that is defined to enable a receiver to estimate DC/LO leakage. Several types of signals could be used. In some implementations, the length of the signal (e.g., the portion of the sequence used for estimation) may be K times 128 samples (e.g., at 1.76 Gsps).

In some implementations, the original signal takes the form of a standard EDMG-STF (pi/2 rotated BPSK Golays) or a signal described above for estimating gain and linearity. This original signal may be filtered by a high pass filter (HPF) that attenuates the direct current (DC) frequency range. For example, in some implementation, the attenuation is for a range of ±4 MHz. In some implementation, the HPF provides at least 35 dB of attenuation. Filters with other characteristics may be used.

In view of the above, the disclosure relates in some aspects to communicating a frame having at least a first header that is phase modulated and to performing high pass filtering of the first header during transmission prior to amplification via a power amplifier. For example, a first device may generate a frame having at least a first header that is phase modulated, perform high pass filtering on the first header prior to amplification by a power amplifier, and send the frame to a second device. The second device may thus obtain a frame having at least a first header that is phase modulated, estimate DC and LO leakage associated with communication of the first header (e.g., estimate the power of these components from RSSI measurements of the high pass filtered signal), and process the remaining portion of the frame (e.g., the data) in a manner that mitigates the effect of the DC and LO leakage. For example, coefficients used in a receive equalizer may be adjusted to compensate for DC/LO leakage. Thus, while the receiver is decoding the headers, relatively simple hardware can be used to concurrently estimate the DC/LO leakage. The performance of the receiver may thereby be quickly adapted to better receive subsequent information in the frame.

Estimating Phase Noise

The disclosure relates in some aspects to estimating phase noise by sending a repetition of sequences. For example, a receiver may use cross-correlation or auto-correlation techniques between different pilot repetitions (or sequences) to determine the frequency offset between the transmitter and the receiver and thereby determine the phase difference. Thus, while the receiver is decoding the headers, relatively simple hardware can be used to concurrently estimate the phase noise. The performance of the receiver may thereby be quickly adapted to better receive subsequent information in the frame. Such an increase in performance may be particularly advantageous in wireless communication systems (e.g., Wi-Fi) that might not always have long term tracking information available. By obtaining an early estimate of phase noise, a receiver in such a system may be able to more quickly lock-on to a received signal.

Estimating Noise or Interference

The disclosure relates in some aspects to estimating noise and/or interference (which may be referred to as noise/interference herein) by sending a repetition of sequences. For example, a receiver may use differentiation (e.g., subtraction) between different pilot repetitions (or sequences) to determine the noise and/or interference present on a channel Thus, while the receiver is decoding the headers, relatively simple hardware can be used to concurrently estimate the noise/interference. The performance of the receiver may thereby be quickly adapted (e.g., by scaling the noise) to better receive subsequent information in the frame.

Example Wireless Communication System

The teachings herein may be implemented using various wireless technologies and/or various spectra. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, Single Carrier (SC), a combination of OFDM, SC, and DSSS communication, or other schemes.

Certain of the devices described herein may further implement Multiple Input Multiple Output (MIMO) technology and be implemented as part of an 802.11 protocol. A MIMO system employs multiple ($N_t$) transmit antennas and multiple ($N_r$) receive antennas for data transmission. A MIMO channel formed by the $N_t$ transmit and $N_r$ receive antennas may be decomposed into $N_s$ independent channels, which are also referred to as spatial channels or streams, where $N_s \leq \min\{N_t, N_r\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point ("AP") may also include, be implemented as, or known as a Transmit Receive Point (TRP), a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also include, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 7:
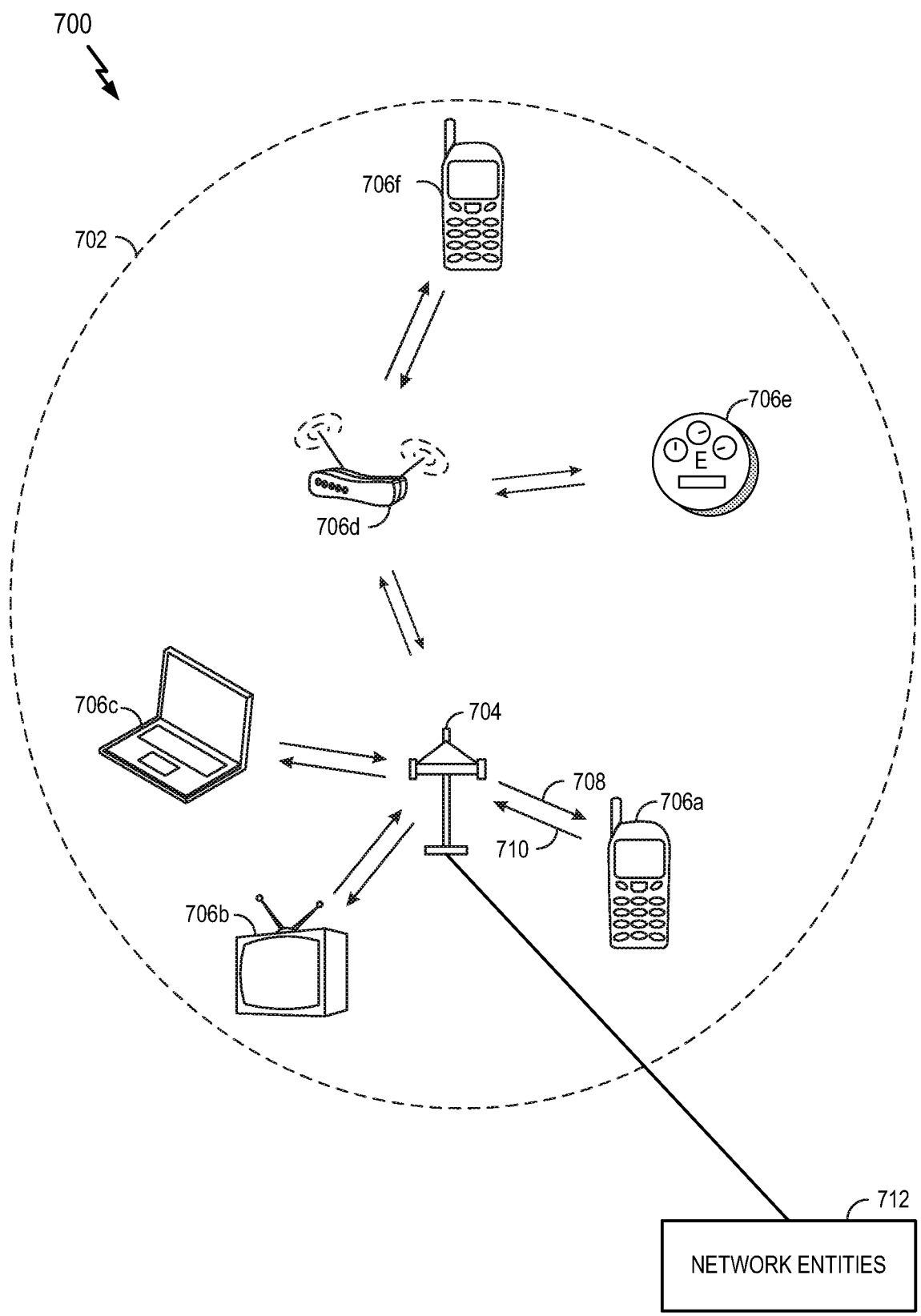
FIG. 7 illustrates an example of a wireless communication system in which aspects of the present disclosure may be employed.

FIG. 7 illustrates an example of a wireless communication system 700 in which aspects of the present disclosure may be employed. The wireless communication system 700 may operate pursuant to a wireless standard, for example the 802.11 standard. The wireless communication system 700 may include an AP 704, which communicates with STAs 706a, 706b, 706c, 706d, 706e, and 706f (collectively STAs 706).

STAs 706e and 706f may have difficulty communicating with the AP 704 or may be out of range and unable to communicate with the AP 704. As such, another STA 706d may be configured as a relay device (e.g., a device including STA and AP functionality) that relays communication between the AP 704 and the STAs 706e and 706f.

A variety of processes and methods may be used for transmissions in the wireless communication system 700 between the AP 704 and the STAs 706. For example, signals may be sent and received between the AP 704 and the STAs 706 in accordance with OFDM/OFDMA techniques. If this is the case, the wireless communication system 700 may be referred to as an OFDM/OFDMA system. Alternatively, signals may be sent and received between the AP 704 and the STAs 706 in accordance with CDMA techniques. If this is the case, the wireless communication system 700 may be referred to as a CDMA system.

A communication link that facilitates transmission from the AP 704 to one or more of the STAs 706 may be referred to as a downlink (DL) 708, and a communication link that facilitates transmission from one or more of the STAs 706 to the AP 704 may be referred to as an uplink (UL) 710. Alternatively, a downlink 708 may be referred to as a forward link or a forward channel, and an uplink 710 may be referred to as a reverse link or a reverse channel.

The AP 704 may act as a base station and provide wireless communication coverage in a basic service area (BSA) 702. The AP 704 along with the STAs 706 associated with the AP 704 and that use the AP 704 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 704 or to some other access point in the network (not shown).

Each of the access points may communicate with one or more network entities (represented, for convenience, by network entities 712 in FIG. 7), including each other, to facilitate wide area network connectivity. A network entity may take various forms such as, for example, one or more radio and/or core network entities. Thus, in various implementations the network entities 712 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 700 might not have a central AP 704, but rather may function as a peer-to-peer network between the STAs 706. Accordingly, the functions of the AP 704 described herein may alternatively be performed by one or more of the STAs 706. Also, as mentioned above, a relay may incorporate at least some of the functionality of an AP and a STA.

Figure 8:
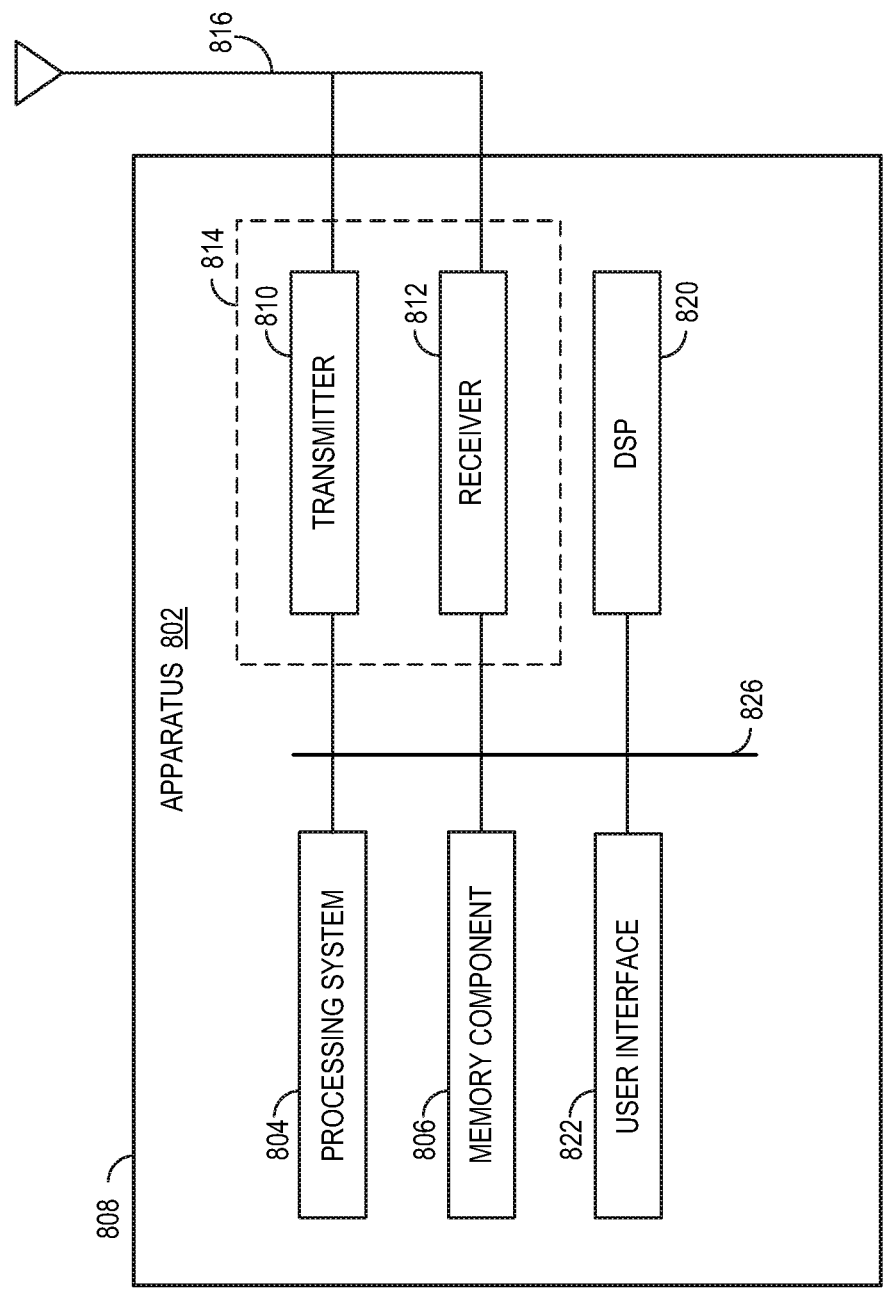
FIG. 8 is a functional block diagram of an example apparatus that may be employed within a wireless communication system in accordance with some aspects of the disclosure.

FIG. 8 illustrates various components that may be utilized in an apparatus 802 (e.g., a wireless device) that may be employed within the wireless communication system 700. The apparatus 802 is an example of a device that may be configured to implement the various methods described herein. For example, the apparatus 802 may be implemented as the AP 704, a relay (e.g., the STA 706d), or one of the STAs 706 of FIG. 7. As another example, the apparatus 802 may correspond to any of the first apparatus 102 of FIG. 1, the second apparatus 106 of FIG. 1, the first apparatus 602 of FIG. 6, or the second apparatus 604 of FIG. 6.

The apparatus 802 may include a processing system 804 that controls operation of the apparatus 802. The processing system 804 may also be referred to as a central processing unit (CPU). A memory component 806 (e.g., including a memory device), which may include both read-only memory (ROM) and random access memory (RAM), provides instructions and data to the processing system 804. A portion of the memory component 806 may also include non-volatile random access memory (NVRAM). The processing system 804 typically performs logical and arithmetic operations based on program instructions stored within the memory component 806. The instructions in the memory component 806 may be executable to implement the methods described herein.

When the apparatus 802 is implemented or used as a transmitting node, the processing system 804 may be configured to select one of a plurality of media access control (MAC) header types, and to generate a packet having that MAC header type. For example, the processing system 804 may be configured to generate a packet including a MAC header and a payload and to determine what type of MAC header to use.

When the apparatus 802 is implemented or used as a receiving node, the processing system 804 may be configured to process packets of a plurality of different MAC header types. For example, the processing system 804 may be configured to determine the type of MAC header used in a packet and process the packet and/or fields of the MAC header.

The processing system 804 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 802 may also include a housing 808 that may include a transmitter 810 and a receiver 812 to allow transmission and reception of data between the apparatus 802 and a remote location. The transmitter 810 and receiver 812 may be combined into single communication device (e.g., a transceiver 814). An antenna 816 may be attached to the housing 808 and electrically coupled to the transceiver 814. The apparatus 802 may also include (not shown) multiple transmitters, multiple receivers, multiple transceivers, and/or multiple antennas. A transmitter 810 and a receiver 812 may be implemented as an integrated device (e.g., embodied as a transmitter circuit and a receiver circuit of a single communication device) in some implementations, may be implemented as a separate transmitter device and a separate receiver device in some implementations, or may be embodied in other ways in other implementations.

The transmitter 810 may be configured to wirelessly transmit packets having different MAC header types. For example, the transmitter 810 may be configured to transmit packets with different types of headers generated by the processing system 804, discussed above.

The receiver 812 may be configured to wirelessly receive packets having different MAC header type. In some aspects, the receiver 812 is configured to detect a type of a MAC header used and process the packet accordingly.

The receiver 812 may be used to detect and quantify the level of signals received by the transceiver 814. The receiver 812 may detect such signals as total energy, energy per subcarrier per symbol, power spectral density and other signals. The apparatus 802 may also include a digital signal processor (DSP) 820 for use in processing signals. The DSP 820 may be configured to generate a data unit for transmission. In some aspects, the data unit may include (e.g., may be) a physical layer data unit (PPDU). In some aspects, the PPDU is referred to as a packet.

The apparatus 802 may further include a user interface 822 in some aspects. The user interface 822 may include a keypad, a microphone, a speaker, and/or a display. The user interface 822 may include any element or component that conveys information to a user of the apparatus 802 and/or receives input from the user.

The various components of the apparatus 802 may be coupled together by a bus system 826. The bus system 826 may include a data bus, for example, as well as a power bus, a control signal bus, and a status signal bus in addition to the data bus. Those of skill in the art will appreciate the components of the apparatus 802 may be coupled together or accept or provide inputs to each other using some other mechanism.

Although a number of separate components are illustrated in FIG. 8, one or more of the components may be combined or commonly implemented. For example, the processing system 804 may be used to implement not only the functionality described above with respect to the processing system 804, but also to implement the functionality described above with respect to the transceiver 814 and/or the DSP 820. Further, each of the components illustrated in FIG. 8 may be implemented using a plurality of separate elements. Furthermore, the processing system 804 may be used to implement any of the components, modules, circuits, or the like described below, or each may be implemented using a plurality of separate elements.

For ease of reference, when the apparatus 802 is configured as a transmitting node, it is hereinafter referred to as an apparatus 802t. Similarly, when the apparatus 802 is configured as a receiving node, it is hereinafter referred to as an apparatus 802r. A device in the wireless communication system 700 may implement only functionality of a transmitting node, only functionality of a receiving node, or functionality of both a transmitting node and a receive node.

As discussed above, the apparatus 802 may take the form of an AP 704 or a STA 706, and may be used to transmit and/or receive communication having a plurality of MAC header types.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 8 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 9:
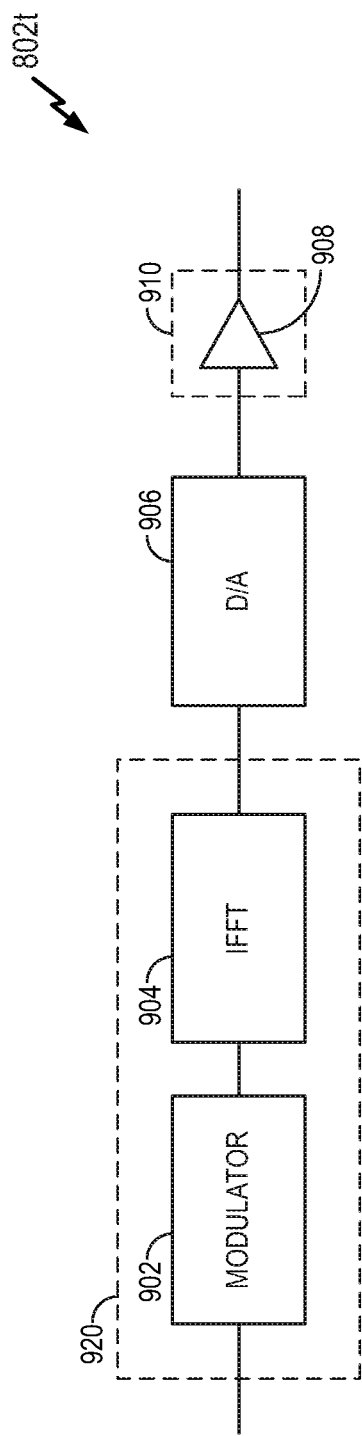
FIG. 9 is a functional block diagram of example components that may be utilized in the apparatus of FIG. 8 to transmit wireless communication.

As discussed above, the apparatus 802 may take the form of an AP 704 or a STA 706, a relay, or some other type of apparatus, and may be used to transmit and/or receive communication. FIG. 9 illustrates various components that may be utilized in the apparatus 802t to transmit wireless communication. The components illustrated in FIG. 9 may be used, for example, to transmit OFDM communication. In some aspects, the components illustrated in FIG. 9 are used to generate and transmit packets to be sent over a bandwidth of less than or equal to 1 MHz.

The apparatus 802t of FIG. 9 may include a modulator 902 configured to modulate bits for transmission. For example, the modulator 902 may determine a plurality of symbols from bits received from the processing system 804 (FIG. 8) or the user interface 822 (FIG. 8), for example by mapping bits to a plurality of symbols according to a constellation. The bits may correspond to user data or to control information. In some aspects, the bits are received in codewords. In one aspect, the modulator 902 may include (e.g., may be) a QAM (quadrature amplitude modulation) modulator, for example, a 16-QAM modulator or a 64-QAM modulator. In other aspects, the modulator 902 may include (e.g., may be) a binary phase-shift keying (BPSK) modulator, a quadrature phase-shift keying (QPSK) modulator, or an 8-PSK modulator.

The apparatus 802t may further include a transform module 904 configured to convert symbols or otherwise modulated bits from the modulator 902 into a time domain. In FIG. 9, the transform module 904 is illustrated as being implemented by an inverse fast Fourier transform (IFFT) module. In some implementations, there may be multiple transform modules (not shown) that transform units of data of different sizes. In some implementations, the transform module 904 may be itself configured to transform units of data of different sizes. For example, the transform module 904 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 904 may be referred to as the size of the transform module 904.

In FIG. 9, the modulator 902 and the transform module 904 are illustrated as being implemented in the DSP 920. In some aspects, however, one or both of the modulator 902 and the transform module 904 are implemented in the processing system 804 or in another element of the apparatus 802t (e.g., see description above with reference to FIG. 8).

As discussed above, the DSP 920 may be configured to generate a data unit for transmission. In some aspects, the modulator 902 and the transform module 904 may be configured to generate a data unit including a plurality of fields including control information and a plurality of data symbols.

Returning to the description of FIG. 9, the apparatus 802t may further include a digital to analog converter 906 configured to convert the output of the transform module into an analog signal. For example, the time-domain output of the transform module 904 may be converted to a baseband OFDM signal by the digital to analog converter 906. The digital to analog converter 906 may be implemented in the processing system 804 or in another element of the apparatus 802 of FIG. 8. In some aspects, the digital to analog converter 906 is implemented in the transceiver 814 (FIG. 8) or in a data transmit processor.

The analog signal may be wirelessly transmitted by the transmitter 910. The analog signal may be further processed before being transmitted by the transmitter 910, for example by being filtered or by being upconverted to an intermediate or carrier frequency. In the aspect illustrated in FIG. 9, the transmitter 910 includes a transmit amplifier 908. Prior to being transmitted, the analog signal may be amplified by the transmit amplifier 908. In some aspects, the amplifier 908 includes (e.g., may be) a low noise amplifier (LNA).

The transmitter 910 is configured to transmit one or more packets or data units in a wireless signal based on the analog signal. The data units may be generated using the processing system 804 (FIG. 8) and/or the DSP 920, for example using the modulator 902 and the transform module 904 as discussed above. Data units that may be generated and transmitted as discussed above are described in additional detail below.

Figure 10:
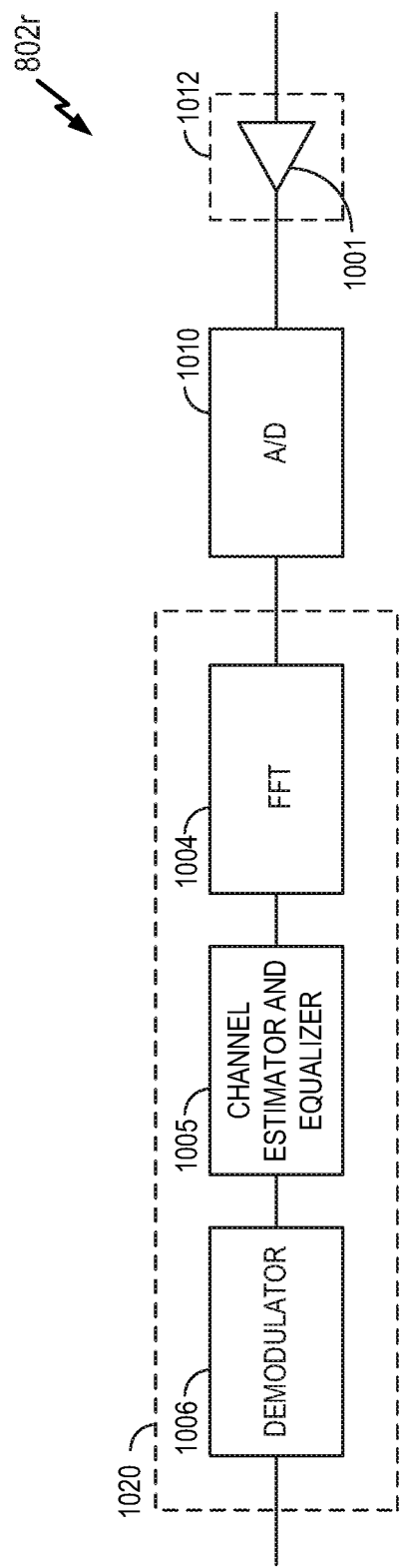
FIG. 10 is a functional block diagram of example components that may be utilized in the apparatus of FIG. 8 to receive wireless communication.

FIG. 10 illustrates various components that may be utilized in the apparatus 802 of FIG. 8 to receive wireless communication. The components illustrated in FIG. 10 may be used, for example, to receive OFDM communication. For example, the components illustrated in FIG. 10 may be used to receive data units transmitted by the components discussed above with respect to FIG. 9.

The receiver 1012 of apparatus 802r is configured to receive one or more packets or data units in a wireless signal. Data units that may be received and decoded or otherwise processed as discussed below.

In the aspect illustrated in FIG. 10, the receiver 1012 includes a receive amplifier 1001. The receive amplifier 1001 may be configured to amplify the wireless signal received by the receiver 1012. In some aspects, the receiver 1012 is configured to adjust the gain of the receive amplifier 1001 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 1001 includes (e.g., may be) an LNA.

The apparatus 802r may include an analog to digital converter 1010 configured to convert the amplified wireless signal from the receiver 1012 into a digital representation thereof. Further to being amplified, the wireless signal may be processed before being converted by the analog to digital converter 1010, for example by being filtered or by being downconverted to an intermediate or baseband frequency. The analog to digital converter 1010 may be implemented in the processing system 804 (FIG. 8) or in another element of the apparatus 802r. In some aspects, the analog to digital converter 1010 is implemented in the transceiver 814 (FIG. 8) or in a data receive processor.

The apparatus 802r may further include a transform module 1004 configured to convert the representation of the wireless signal into a frequency spectrum. In FIG. 10, the transform module 1004 is illustrated as being implemented by a fast Fourier transform (FFT) module. In some aspects, the transform module may identify a symbol for each point that it uses. As described above with reference to FIG. 9, the transform module 1004 may be configured with a plurality of modes, and may use a different number of points to convert the signal in each mode. The number of points used by the transform module 1004 may be referred to as the size of the transform module 1004. In some aspects, the transform module 1004 may identify a symbol for each point that it uses.

The apparatus 802r may further include a channel estimator and equalizer 1005 configured to form an estimate of the channel over which the data unit is received, and to remove certain effects of the channel based on the channel estimate. For example, the channel estimator and equalizer 1005 may be configured to approximate a function of the channel, and the channel equalizer may be configured to apply an inverse of that function to the data in the frequency spectrum.

The apparatus 802r may further include a demodulator 1006 configured to demodulate the equalized data. For example, the demodulator 1006 may determine a plurality of bits from symbols output by the transform module 1004 and the channel estimator and equalizer 1005, for example by reversing a mapping of bits to a symbol in a constellation. The bits may be processed or evaluated by the processing system 804 (FIG. 8), or used to display or otherwise output information to the user interface 822 (FIG. 8). In this way, data and/or information may be decoded. In some aspects, the bits correspond to codewords. In one aspect, the demodulator 1006 includes (e.g., may be) a QAM (quadrature amplitude modulation) demodulator, for example an 8-QAM demodulator or a 64-QAM demodulator. In other aspects, the demodulator 1006 includes (e.g., may be) a binary phase-shift keying (BPSK) demodulator or a quadrature phase-shift keying (QPSK) demodulator.

In FIG. 10, the transform module 1004, the channel estimator and equalizer 1005, and the demodulator 1006 are illustrated as being implemented in the DSP 1020. In some aspects, however, one or more of the transform module 1004, the channel estimator and equalizer 1005, and the demodulator 1006 are implemented in the processing system 804 (FIG. 8) or in another element of the apparatus 802 (FIG. 8).

As discussed above, the wireless signal received at the receiver 812 includes one or more data units. Using the functions or components described above, the data units or data symbols therein may be decoded evaluated or otherwise evaluated or processed. For example, the processing system 804 (FIG. 8) and/or the DSP 1020 may be used to decode data symbols in the data units using the transform module 1004, the channel estimator and equalizer 1005, and the demodulator 1006.

Data units exchanged by the AP 704 and the STA 706 may include control information or data, as discussed above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 802*t* shown in FIG. 9 is an example of a single transmit chain used for transmitting via an antenna. The apparatus 802*r* shown in FIG. 10 is an example of a single receive chain used for receiving via an antenna. In some implementations, the apparatus 802*t* or 802*r* may implement a portion of a MIMO system using multiple antennas to simultaneously transmit data.

The wireless communication system 700 may employ methods to allow efficient access of the wireless medium based on unpredictable data transmissions while avoiding collisions. As such, in accordance with various aspects, the wireless communication system 700 performs carrier sense multiple access/collision avoidance (CSMA/CA) that may be referred to as the Distributed Coordination Function (DCF). More generally, an apparatus 802 having data for transmission senses the wireless medium to determine if the channel is already occupied. If the apparatus 802 senses the channel is idle, then the apparatus 802 transmits prepared data. Otherwise, the apparatus 802 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus may include a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may be implemented as a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may be implemented as an access point, a relay, or an access terminal.

An access terminal may include, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may be implemented as a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may include, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may include, be implemented as, or known as a relay node, a relay device, a relay station, a relay apparatus, or some other similar terminology. As discussed above, in some aspects, a relay may include some access terminal functionality and some access point functionality.

In some aspects, a wireless apparatus may be implemented as an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively nonportable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "$3^{rd}$ Generation Partnership Project" (3GPP), while cdma2000 is described in documents from an organization named "$3^{rd}$ Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1×RTT, 1×EV-DO Re10, RevA, RevB) technology and other technologies.

Example Communication Device

Figure 11:
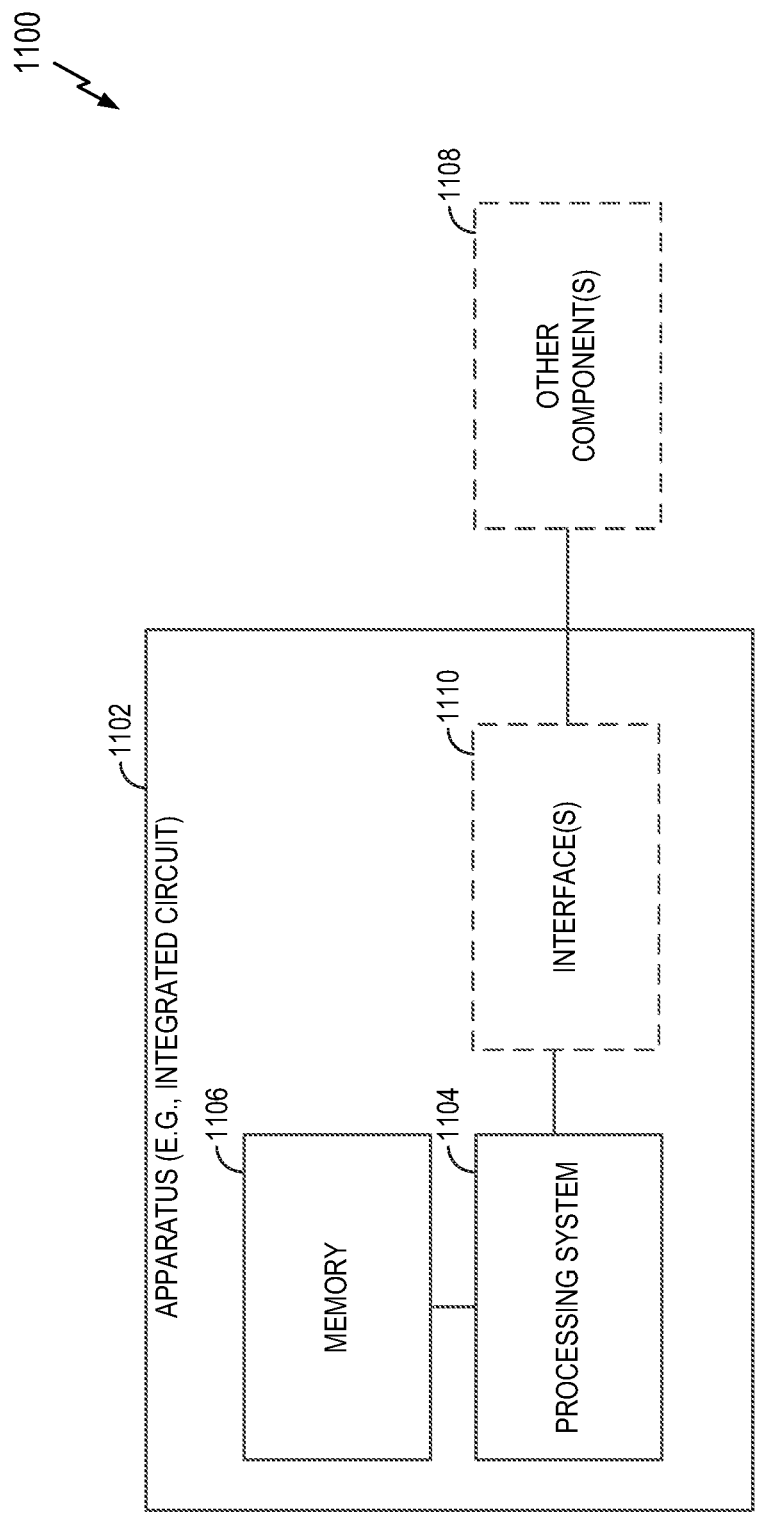
FIG. 11 is a functional block diagram of an example apparatus in accordance with some aspects of the disclosure.

FIG. 11 illustrates an example apparatus 1100 (e.g., an AP, an AT, or some other type of wireless communication node) according to certain aspects of the disclosure. The apparatus 1100 includes an apparatus 1102 (e.g., an integrated circuit) and, optionally, at least one other component 1108. In some aspects, the apparatus 1102 may be configured to operate in a wireless communication node (e.g., an AP or an AT) and to perform one or more of the operations described herein. For convenience, a wireless communication node may be referred to herein as a wireless node. In some aspects, the apparatus 1102 may correspond to any of the first apparatus 102 of FIG. 1, the second apparatus 106 of FIG. 1, the first apparatus 602 of FIG. 6, or the second apparatus 604 of FIG. 6. The apparatus 1102 includes a processing system 1104, and a memory 1106 coupled to the processing system 1104. Example implementations of the processing system 1104 are provided herein. In some aspects, the processing system 1104 and the memory 1106 of FIG. 11 may correspond to the processing system 804 and the memory component 806 of FIG. 8.

The processing system 1104 is generally adapted for processing, including the execution of such programming stored on the memory 1106. For example, the memory 1106 may store instructions that, when executed by the processing system 1104, cause the processing system 1104 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 1102 communicates with at least one other component (e.g., a component 1108 external to the apparatus 1102) of the apparatus 1100. To this end, in some implementations, the apparatus 1102 may include at least one interface 1110 (e.g., a send/receive interface) coupled to the processing system 1104 for outputting and/or obtaining (e.g., sending and/or receiving) information (e.g., received information, generated information, decoded information, messages, etc.) between the processing system 1104 and the other component 1108. In some implementations, the interface 1110 may include an interface bus, bus drivers, bus receivers, other suitable circuitry, or a combination thereof. In some implementations, the interface 1110 may include radio frequency (RF) circuitry (e.g., an RF transmitter and/or an RF receiver). In some implementations, the interface 1110 may be configured to interface the apparatus 1102 to one or more other components of the apparatus 1100 (other components not shown in FIG. 11). For example, the interface 1110 may be configured to interface the processing system 1104 to a radio frequency (RF) front end (e.g., an RF transmitter and/or am RF receiver). In some implementations, a first interface and a second interface may correspond to the same interface. For example, an input/output interface (e.g., a transceiver or bus interface) may include a first interface (e.g., an input interface) and a second interface (e.g., an output interface).

The apparatus 1102 may communicate with other apparatuses in various ways. In cases where the apparatus 1102 include an RF transceiver (not shown in FIG. 11), the apparatus may transmit and receive information (e.g. a frame, a message, bits, etc.) via RF signaling. In some cases, rather than transmitting information via RF signaling, the apparatus 1102 may have an interface to provide (e.g., output, send, transmit, etc.) information for RF transmission. For example, the processing system 1104 may output information, via a bus interface, to an RF front end for RF transmission. Similarly, rather than receiving information via RF signaling, the apparatus 1102 may have an interface to obtain information that is received by another apparatus. For example, the processing system 1104 may obtain (e.g., receive) information, via a bus interface, from an RF receiver that received the information via RF signaling.

Example Processes

Figure 12:
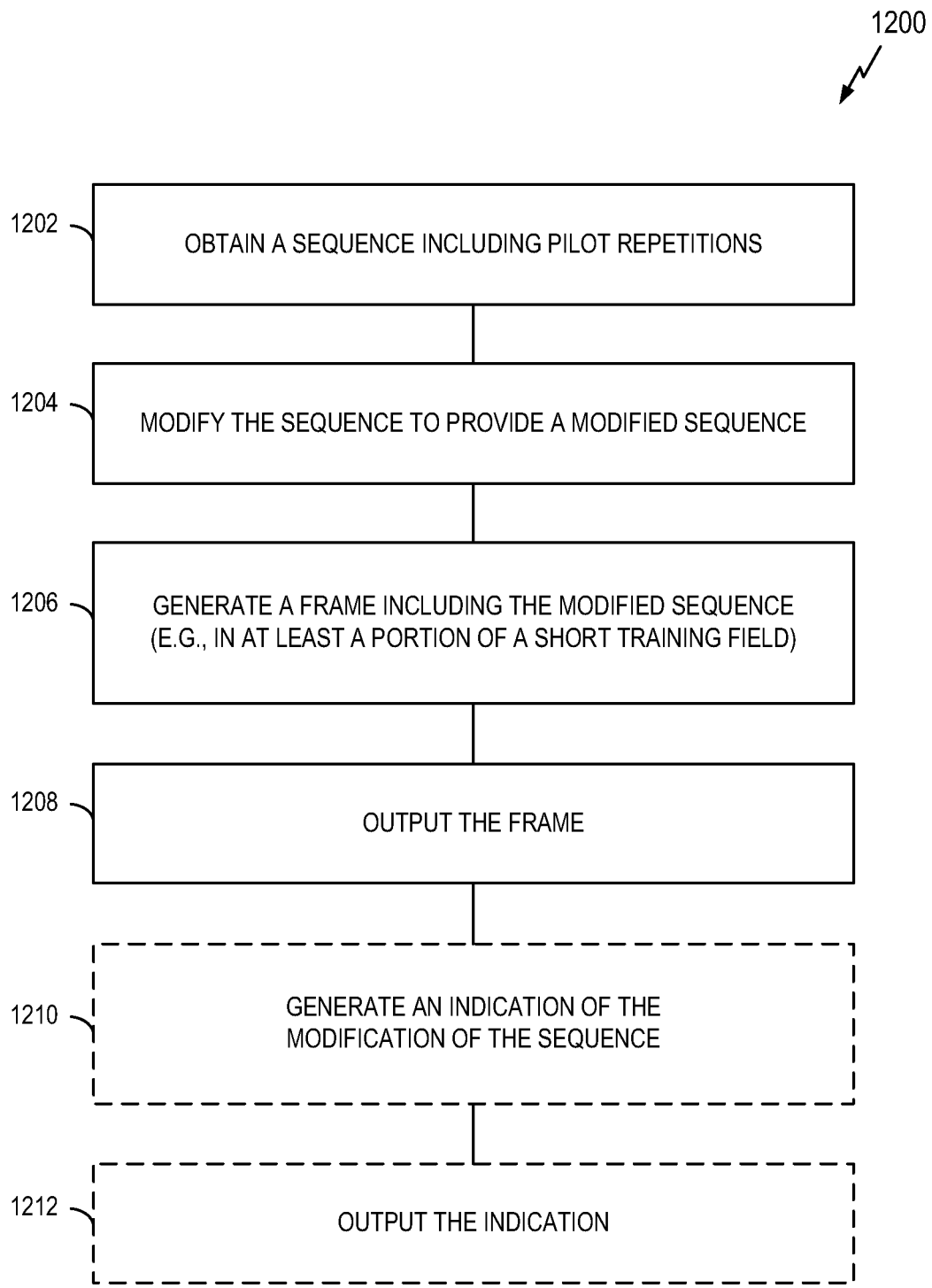
FIG. 12 is a flow diagram of an example process in accordance with some aspects of the disclosure.

FIG. 12 illustrates a process 1200 for communication in accordance with some aspects of the disclosure. The process 1200 may take place within a processing system (e.g., the processing system 1104 of FIG. 11), which may be located in an AP, an AT, or some other suitable apparatus. Of course, in various aspects within the scope of the disclosure, the process 1200 may be implemented by any suitable apparatus capable of supporting communication-related operations in accordance with the teachings herein.

At block 1202, an apparatus (e.g., a chip or a wireless node that will be transmitting a frame) obtains a sequence including pilot repetitions (e.g., a sequence of pilot repetitions). For example, a chip (e.g., an integrated circuit) may obtain sequence information from a memory device, a receiver, or some other component. As another example, a receiver may receive the sequence information.

At block 1204, the apparatus modifies the sequence to provide a modified sequence. In some aspects, the modified sequence may include a signal defined for linearity estimation. In some aspects, the modified sequence may include a signal defined for leakage estimation. In some aspects, the modification of the sequence may include applying a high-pass filter to at least one of the pilot repetitions of the sequence. In some aspects, the modification of the sequence may include high-pass filtering at least one of the pilot repetitions of the sequence.

In some aspects, the modification of the sequence may include applying a plurality of gains to the sequence (e.g., applying different gains to different parts of the sequence). In some aspects, applying a plurality of gains to the sequence may include applying different gains to different pilot repetitions of the sequence. In some aspects, the plurality of gains may be specified by discrete amplitude values (e.g. a list of discrete amplitude values). In some aspects, the plurality of gains may be specified by at least one amplitude slope (e.g., a dual amplitude slope). In some aspects, the plurality of gains may be specified by at least one power slope (e.g., a dual power slope).

At block 1206, the apparatus generates a frame that includes the modified sequence. In some aspects, the generation of the frame may involve including the modified sequence in at least a portion of a short training field of the frame, in at least a portion of a short training field. In some aspects, the frame may be an IEEE 802.11ay frame. In some aspects, the short training field may be an extended directional multi-gigabit short training field (EDMG-STF). In some aspects, the at least a portion of the short training field may be a first portion (e.g., the beginning) of the extended directional multi-gigabit short training field. In some aspects, the sequence may be a first part of a set of pilot repetitions for the extended directional multi-gigabit short training field.

At block 1208, the apparatus outputs the frame generated at block 1204. For example, a chip may output the frame for transmission (e.g., by a transmitter). As another example, a wireless node may transmit the frame.

At optional block 1210, the apparatus may generate an indication of the modification of the sequence. In some aspects, the indication may indicate at least one gain applied to at least one of the pilot repetitions of the sequence. In some aspects, the indication may indicate a plurality of gains applied to the sequence (e.g., applied to different pilot repetitions of the sequence). In some aspects, the indication may indicate at least one high pass filter characteristic applied to the sequence. In some aspects, the indication may indicate support for the modification of the sequence. In some aspects, the indication may indicate a length of the modified sequence. In some aspects, the indication may indicate at least one signal type of the modified sequence. In some aspects, the at least one signal type may include a gain estimation signal, a linearity estimation signal, a direct current leakage estimation signal, a local oscillator leakage estimation signal, or any combination thereof. In some aspects, the generation of the frame may include including the indication in an extended directional multi-gigabit (EDMG) header A of the frame or in a legacy directional multi-gigabit (DMG) header of the frame. In cases where the modification of the sequence includes high-pass filtering at least one of the pilot repetitions of the sequence, the generation of the indication may involve generating an indication of the high-pass filtering. Here, the indication may indicate support for the high-pass filtering.

At optional block 1212, the apparatus may output the indication generated at block 1208. For example, a chip may output the indication for transmission (e.g., by a transmitter). As another example, a wireless node may transmit the indication.

Figure 13:
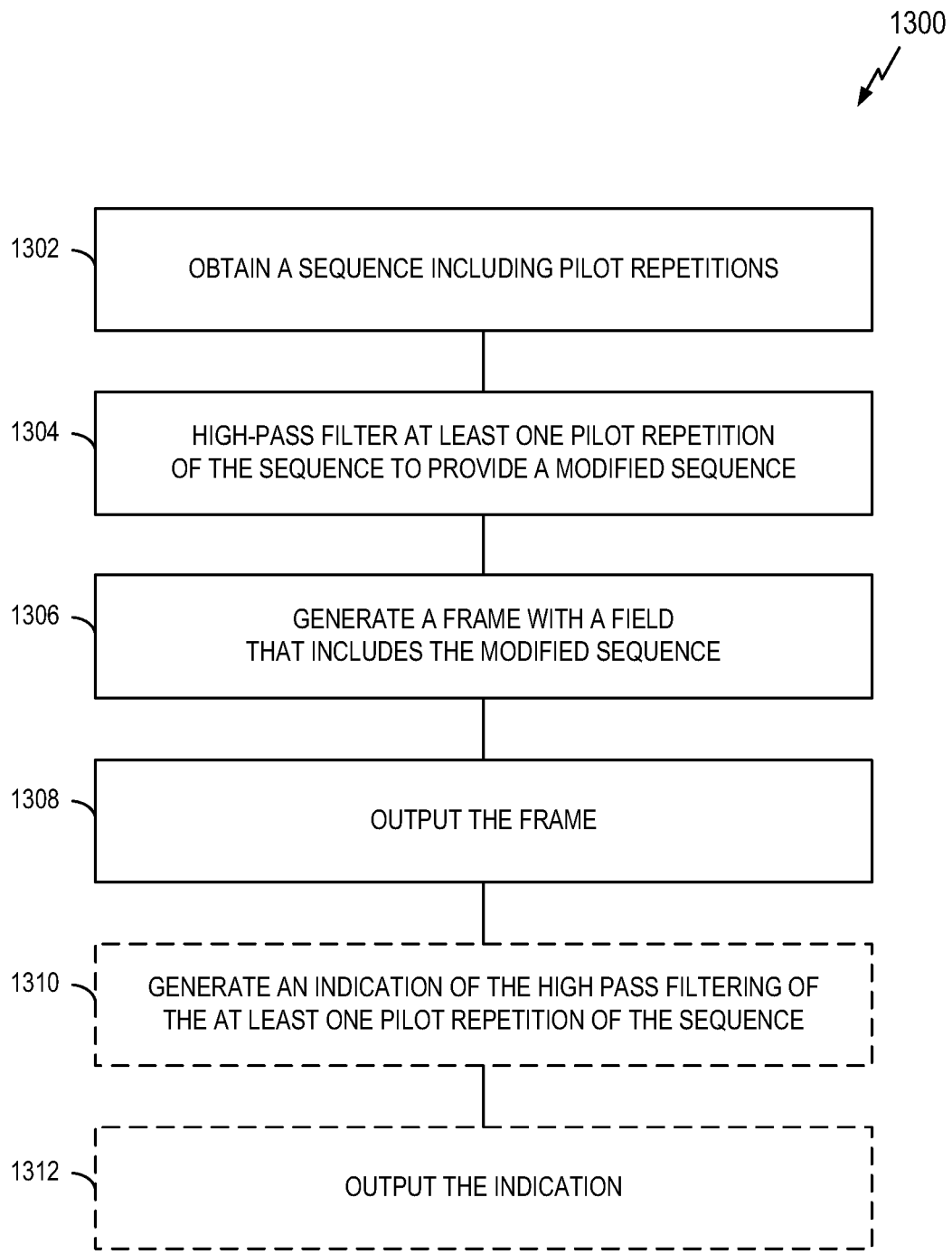
FIG. 13 is a flow diagram of another example process in accordance with some aspects of the disclosure.

FIG. 13 illustrates a process 1300 for communication in accordance with some aspects of the disclosure. One or more aspects of the process 1300 may be used in conjunction with (e.g., in addition to or as part of) the process 1200 of FIG. 12. The process 1300 may take place within a processing system (e.g., the processing system 1104 of FIG. 11), which may be located in an AP, an AT, or some other suitable apparatus. Of course, in various aspects within the scope of the disclosure, the process 1300 may be implemented by any suitable apparatus capable of supporting communication-related operations in accordance with the teachings herein.

At block 1302, an apparatus (e.g., a chip or a wireless node that will be transmitting a frame) obtains a sequence including pilot repetitions. For example, a chip (e.g., an integrated circuit) may obtain sequence information from a memory device, a receiver, or some other component. As another example, a receiver may receive the sequence information. In some aspects, the operations of block 1302 may correspond to the operations of block 1202 of FIG. 12.

At block 1304, the apparatus high-pass filters at least one pilot repetition of the sequence to provide a modified sequence.

At block 1306, the apparatus generates a frame with a field that includes the modified sequence. In some aspects, the field may include a short training field.

At block 1308, the apparatus outputs the frame generated at block 1304. For example, a chip may output the frame for transmission (e.g., by a transmitter). As another example, a wireless node may transmit the frame.

At optional block 1310, the apparatus may generate an indication of the high pass filtering of the at least one pilot repetition of the sequence. In some aspects, the indication may indicate at least one high pass filter characteristic of the high pass filtering. In some aspects, the indication may indicate support for the high pass filtering of the at least one pilot repetition of the sequence. In some aspects, the indication may indicate a length of the modified sequence. In some aspects, the generation of the frame may involve including the indication in an extended directional multi-gigabit (EDMG) header A of the frame or in a legacy directional multi-gigabit (DMG) header of the frame.

At optional block 1312, the apparatus may output the indication generated at block 1308. For example, a chip may output the indication for transmission (e.g., by a transmitter). As another example, a wireless node may transmit the indication.

Figure 14:
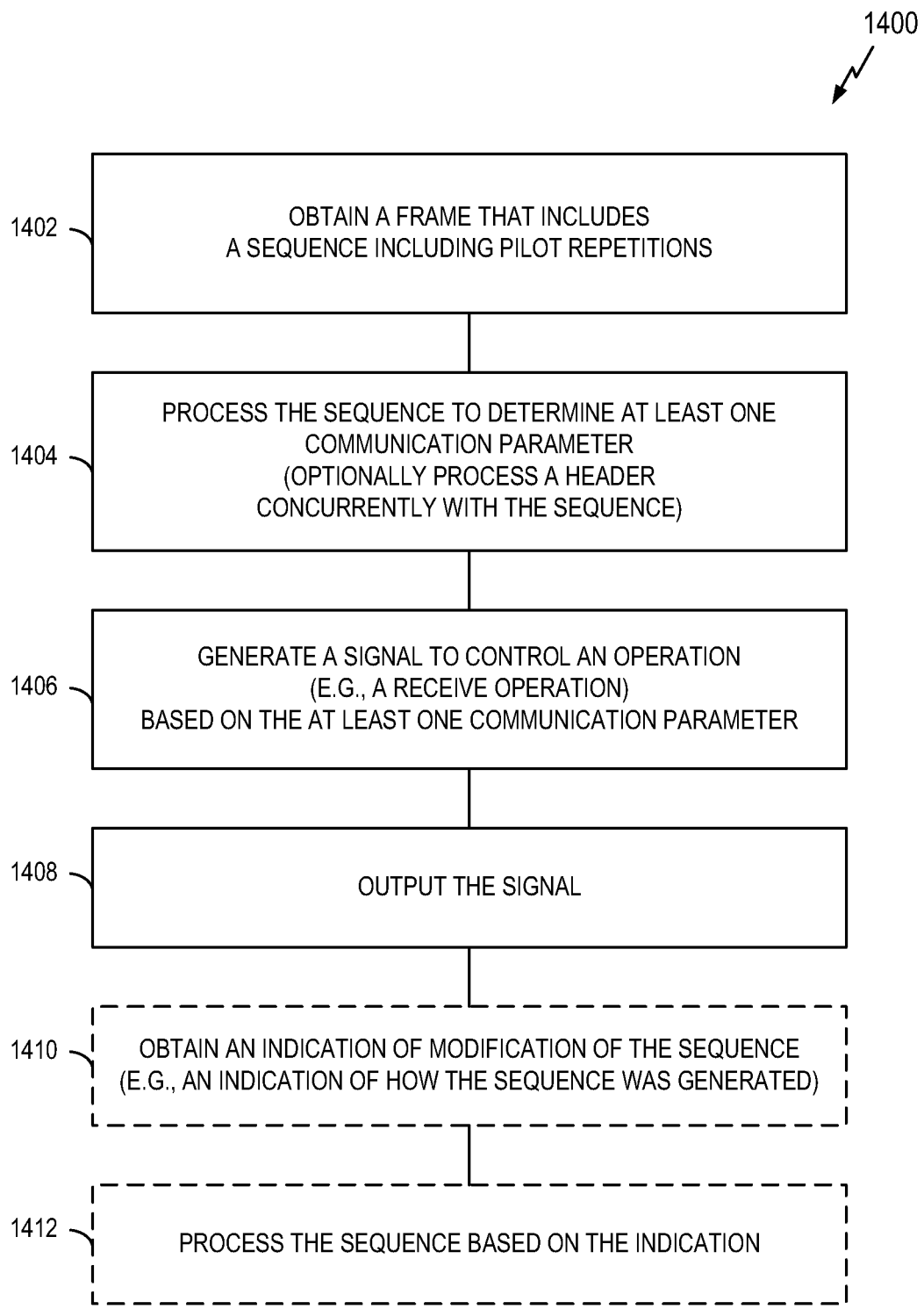
FIG. 14 is a flow diagram of another example process in accordance with some aspects of the disclosure.

FIG. 14 illustrates a process 1400 for communication in accordance with some aspects of the disclosure. The process 1400 may take place within a processing system (e.g., the processing system 1104 of FIG. 11), which may be located in an AP, an AT, or some other suitable apparatus. Of course, in various aspects within the scope of the disclosure, the process 1400 may be implemented by any suitable apparatus capable of supporting communication-related operations in accordance with the teachings herein.

At block 1402, an apparatus (e.g., a chip or a wireless node that is currently receiving) obtains a frame (e.g., including a short training field). For example, a chip (e.g., an integrated circuit) may obtain a received frame (e.g., received by a receiver). As another example, a receiver may receive the frame.

In some aspects, the frame may include a sequence that includes pilot repetitions. For example, the frame may include a short training field, and at least a portion of the short training field may include the sequence.

In some aspects, the frame may be an IEEE 802.11ay frame. In some aspects, the short training field may be an extended directional multi-gigabit short training field (EDMG-STF). In some aspects, the at least a portion of the short training field may be a first portion (e.g., the beginning) of the extended directional multi-gigabit short training field. In some aspects, the sequence may be a first part of a set of pilot repetitions for the extended directional multi-gigabit short training field.

At block 1404, the apparatus processes the sequence to determine at least one communication parameter. In some aspects, the frame may include a header whereby the header is processed concurrently with the processing of the sequence. For example, the apparatus may estimate a transfer function based on modification of the pilot repetitions (e.g., included in the header), and generate a communication parameter based on the estimated transfer function such that a receiver may process the remaining portion of the frame (e.g., the data) based on the communication parameter (e.g., based on the estimated transfer function).

In some aspects, the at least one communication parameter may include: gain, linearity, direct current (DC) leakage, local oscillator (LO) leakage, phase noise, noise, interference, or any combination thereof. For example, by processing the sequence, the apparatus may determine: at least one gain applied to a sequence by the transmitter, linearity of the transmitter (e.g., linearity of a power amplifier and/or a low noise amplifier), DC leakage of the transmitter, LO leakage of the transmitter, phase noise of the transmitter, noise/interference imparted on the transmitted signal, or any combination thereof.

In some aspects, the at least one communication parameter may include a plurality of gains applied to the sequence. In some aspects, the plurality of gains applied to the sequence may include different gains applied to different pilot repetitions of the sequence. In some aspects, the plurality of gains may be specified by discrete amplitude values (e.g. a list of discrete amplitude values). In some aspects, the plurality of gains may be specified by at least one amplitude slope (e.g., a dual amplitude slope). In some aspects, the plurality of gains may be specified by at least one power slope (e.g., a dual power slope).

In some aspects, the determination of the at least one communication parameter may include determining leakage associated with transmission of the frame. The leakage may include direct current leakage, local oscillator leakage, or any combination thereof.

In some aspects, the determination of the at least one communication parameter may include determining phase noise associated with transmission of the frame. In this case, the process 1400 may include: obtaining an indication that the sequence can be used for the determination of the phase noise; and processing the sequence based on the indication.

In addition, the indication may indicate a quantity of symbols of the sequence to be used for the determination of the phase noise.

In some aspects, the determination of the at least one communication parameter may include determining noise or interference associated with transmission of the frame. In this case, the process 1400 may include: obtaining an indication that the sequence can be used for the determination of the noise or interference; and processing the sequence based on the indication. In addition, the indication may indicate a quantity of symbols of the sequence to be used for the determination of the noise or interference.

At block 1406, the apparatus generates a signal to control an operation (e.g., a receive operation). In some aspects, the generation of the signal may be based on the at least one communication parameter. For example, the apparatus may generate a control signal based on the at least one communication parameter, wherein the control signal is to control operation of a receiver. In some aspects, the operation (e.g., the operation of the receiver) may include: channel estimation, equalization, decimation, frequency correlation, compression, phase lock loop tracking, backoff of dynamic range, or any combination thereof. For example, the generation of the signal may involve generating: a channel estimation control signal, an equalization control signal, a decimation control signal, a frequency correlation control signal, a compression control signal, a phase lock loop tracking control signal, a dynamic range backoff control signal, or any combination thereof.

At block 1408, the apparatus outputs the signal. For example, a chip may send the signal to another component (e.g., a receiver). As another example, a chip may output the signal for transmission (e.g., by a transmitter). As yet another example, a wireless node may transmit the signal. In some implementations, an interface of the apparatus may provide the signal to a receiver.

At optional block 1410, the apparatus may obtain an indication of modification of the sequence (e.g., an indication of how the sequence was generated). In some aspects, the indication may indicate at least one gain applied to at least one of the pilot repetitions of the sequence. In some aspects, the indication may indicate a plurality of gains applied to the sequence (e.g., applied to different pilot repetitions of the sequence). In some aspects, the indication may indicate at least one high pass filter characteristic applied to the sequence. In some aspects, the indication may indicate support for modification of the sequence. In some aspects, the indication may indicate a length of the sequence (e.g., a modified sequence). In some aspects, the indication may indicate at least one signal type of the sequence (e.g., a modified sequence). In some aspects, the at least one signal type may include a gain estimation signal, a linearity estimation signal, a direct current leakage estimation signal, a local oscillator leakage estimation signal, or any combination thereof. In some aspects, the indication may be included in an extended directional multi-gigabit (EDMG) header A of the frame or in a legacy directional multi-gigabit (DMG) header of the frame.

At optional block 1412, the apparatus may process the sequence based on the indication. For example, the apparatus may estimate one or more of gain, linearity, the DC leakage, or LO leakage depending on the value or values of the indication.

Figure 15:
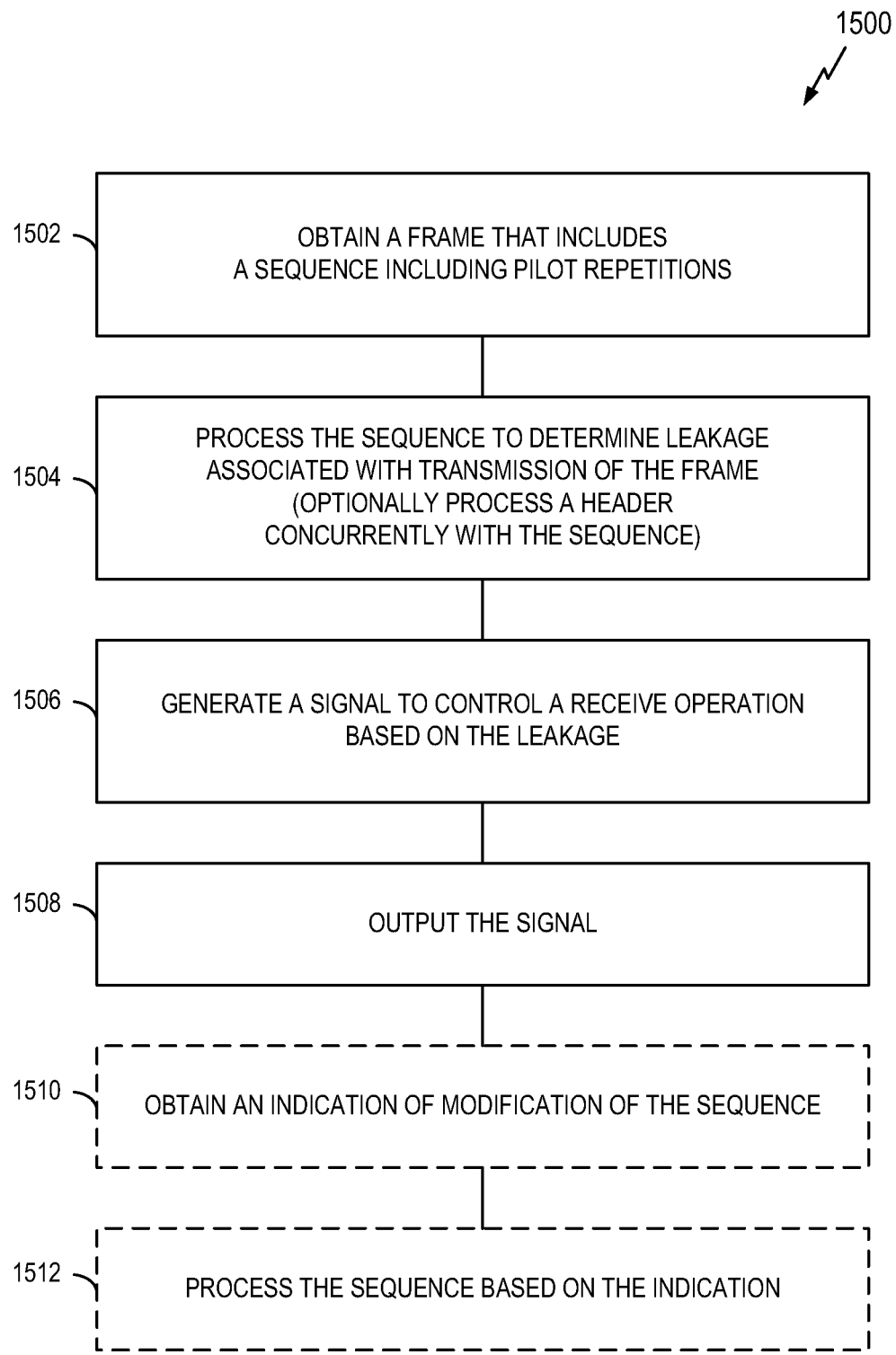
FIG. 15 is a flow diagram of another example process in accordance with some aspects of the disclosure.

FIG. 15 illustrates a process 1500 for communication in accordance with some aspects of the disclosure. One or more aspects of the process 1500 may be used in conjunction with (e.g., in addition to or as part of) the process 1400 of FIG.

14. The process 1500 may take place within a processing system (e.g., the processing system 1104 of FIG. 11), which may be located in an AP, an AT, or some other suitable apparatus. Of course, in various aspects within the scope of the disclosure, the process 1500 may be implemented by any suitable apparatus capable of supporting communication-related operations in accordance with the teachings herein.

At block 1502, an apparatus (e.g., a chip or a wireless node that is currently receiving) obtains a frame. For example, a chip (e.g., an integrated circuit) may obtain a received frame (e.g., received by a receiver). As another example, a receiver may receive the frame. In some aspects, the operations of block 1502 may correspond to the operations of block 1402 of FIG. 14.

In some aspects, the frame may include a sequence that includes pilot repetitions. In some aspects, the frame may include a short training field that includes the sequence.

At block 1504, the apparatus processes the sequence to determine leakage (e.g., DC leakage and/or LO leakage) associated with the transmission of the frame. In some aspects, the frame may include a header whereby the header is processed concurrently with the processing of the sequence. In some aspects, the leakage may include direct current leakage, local oscillator leakage, or any combination thereof.

At block 1506, the apparatus generates a signal to control an operation (e.g., a receive operation) based on the leakage. For example, the apparatus may generate a control signal based on the leakage, wherein the control signal is to control operation of a receiver.

At block 1508, the apparatus outputs the signal. For example, a chip may send the signal to another component (e.g., a receiver). As another example, a chip may output the signal for transmission (e.g., by a transmitter). As yet another example, a wireless node may transmit the signal. In some implementations, an interface of the apparatus may provide the signal to a receiver.

At optional block 1510, the apparatus may obtain an indication of modification of the sequence. In some aspects, the indication may indicate at least one high pass filter characteristic applied to the sequence. In some aspects, the indication may indicate support for the modification of the sequence. In some aspects, the indication may indicate a length of the modified sequence. In some aspects, the indication may be included in an extended directional multi-gigabit (EDMG) header A of the frame or in a legacy directional multi-gigabit (DMG) header of the frame.

At optional block 1512, the apparatus may process the sequence based on the indication. In some aspects, the operations of block 1512 may correspond to the operations of block 1412 of FIG. 14.

Figure 16:
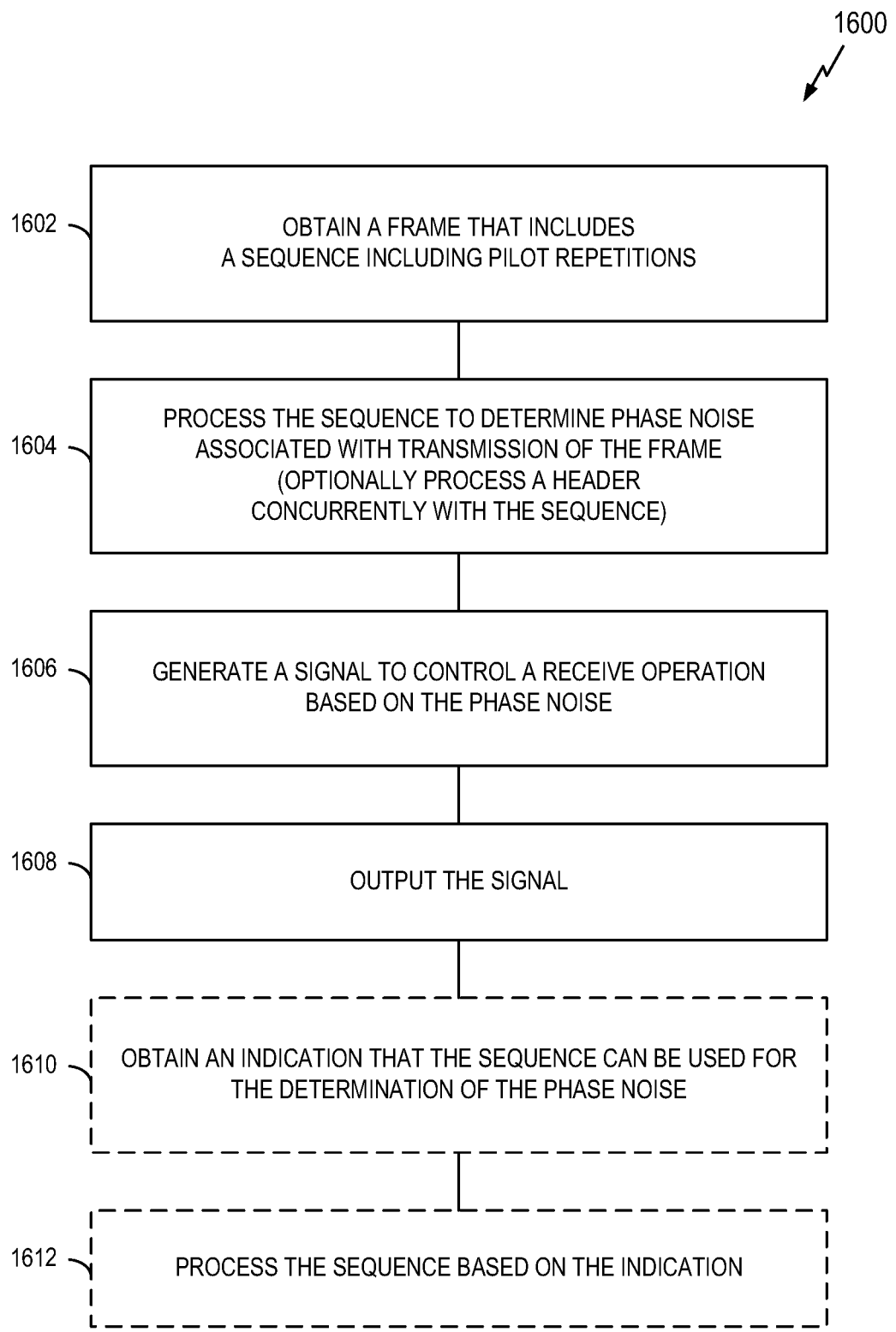
FIG. 16 is a flow diagram of another example process in accordance with some aspects of the disclosure.

FIG. 16 illustrates a process 1600 for communication in accordance with some aspects of the disclosure. One or more aspects of the process 1600 may be used in conjunction with (e.g., in addition to or as part of) the process 1400 of FIG. 14. The process 1600 may take place within a processing system (e.g., the processing system 1104 of FIG. 11), which may be located in an AP, an AT, or some other suitable apparatus. Of course, in various aspects within the scope of the disclosure, the process 1600 may be implemented by any suitable apparatus capable of supporting communication-related operations in accordance with the teachings herein.

At block 1602, an apparatus (e.g., a chip or a wireless node that is currently receiving) obtains a frame. For example, a chip (e.g., an integrated circuit) may obtain a received frame (e.g., received by a receiver). As another example, a receiver may receive the frame. In some aspects, the operations of block 1602 may correspond to the operations of block 1402 of FIG. 14.

In some aspects, the frame may include a sequence that includes pilot repetitions. In some aspects, the frame may include a short training field that includes the sequence.

At block 1604, the apparatus processes the sequence to determine phase noise associated with the transmission of the frame. In some aspects, the frame may include a header whereby the header is processed concurrently with the processing of the sequence.

At block 1606, the apparatus generates a signal to control an operation (e.g., a receive operation) based on the phase noise. For example, the apparatus may generate a control signal based on the phase noise, wherein the control signal is to control operation of a receiver.

At block 1608, the apparatus outputs the signal. For example, a chip may send the signal to another component (e.g., a receiver). As another example, a chip may output the signal for transmission (e.g., by a transmitter). As yet another example, a wireless node may transmit the signal. In some implementations, an interface of the apparatus may provide the signal to a receiver.

At optional block 1610, the apparatus may obtain an indication that the sequence can be used for the determination of the phase noise. In some aspects, the indication may indicate a quantity of symbols of the sequence to be used for the determination of the phase noise. In some aspects, the indication may be included in an extended directional multi-gigabit (EDMG) header A of the frame or in a legacy directional multi-gigabit (DMG) header of the frame.

At optional block 1612, the apparatus may process the sequence based on the indication. In some aspects, the operations of block 1612 may correspond to the operations of block 1412 of FIG. 14.

Figure 17:
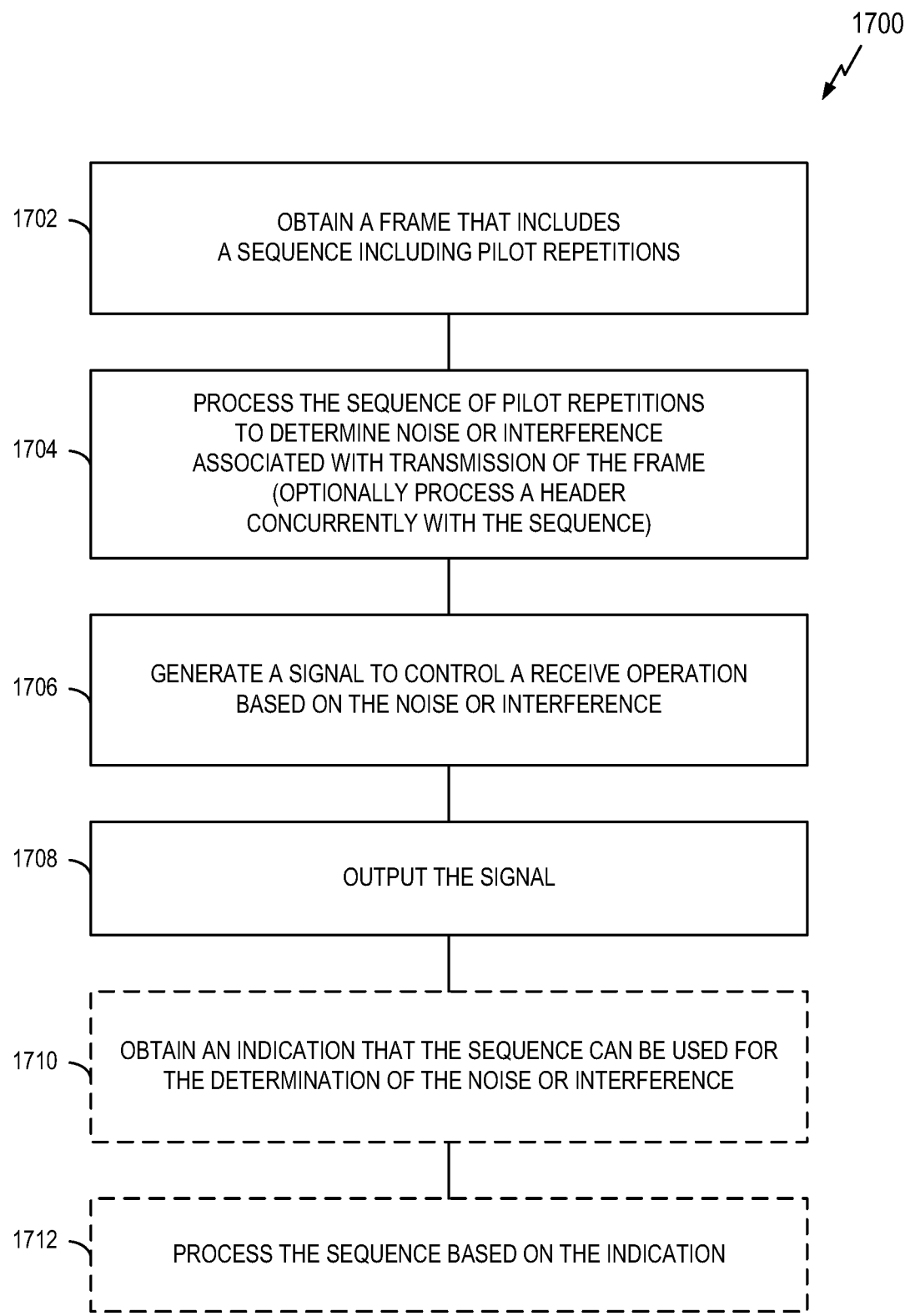
FIG. 17 is a flow diagram of another example process in accordance with some aspects of the disclosure.

FIG. 17 illustrates a process 1700 for communication in accordance with some aspects of the disclosure. One or more aspects of the process 1700 may be used in conjunction with (e.g., in addition to or as part of) the process 1400 of FIG. 14. The process 1700 may take place within a processing system (e.g., the processing system 1104 of FIG. 11), which may be located in an AP, an AT, or some other suitable apparatus. Of course, in various aspects within the scope of the disclosure, the process 1700 may be implemented by any suitable apparatus capable of supporting communication-related operations in accordance with the teachings herein.

At block 1702, an apparatus (e.g., a chip or a wireless node that is currently receiving) obtains a frame. For example, a chip (e.g., an integrated circuit) may obtain a received frame (e.g., received by a receiver). As another example, a receiver may receive the frame. In some aspects, the operations of block 1702 may correspond to the operations of block 1402 of FIG. 14.

In some aspects, the frame may include a sequence that includes pilot repetitions. In some aspects, the frame may include a short training field that includes the sequence.

At block 1704, the apparatus processes the sequence to determine noise or interference associated with the transmission of the frame. In some aspects, the frame may include a header whereby the header is processed concurrently with the processing of the sequence.

At block 1706, the apparatus generates a signal to control an operation (e.g., a receive operation) based on the noise or interference. For example, the apparatus may generate a control signal based on the noise or interference, wherein the control signal is to control operation of a receiver.

At block 1708, the apparatus outputs the signal. For example, a chip may send the signal to another component (e.g., a receiver). As another example, a chip may output the signal for transmission (e.g., by a transmitter). As yet another example, a wireless node may transmit the signal. In some implementations, an interface of the apparatus may provide the signal to a receiver.

At optional block 1710, the apparatus may obtain an indication that the sequence can be used for the determination of the noise or interference. In some aspects, the indication may indicate a quantity of symbols of the sequence to be used for the determination of the noise or interference. In some aspects, the indication may be included in an extended directional multi-gigabit (EDMG) header A of the frame or in a legacy directional multi-gigabit (DMG) header of the frame.

At optional block 1712, the apparatus may process the sequence based on the indication. In some aspects, the operations of block 1712 may correspond to the operations of block 1412 of FIG. 14.

In some aspects, an apparatus may perform any combination of the operations described above.

Example Apparatuses

Figure 18:
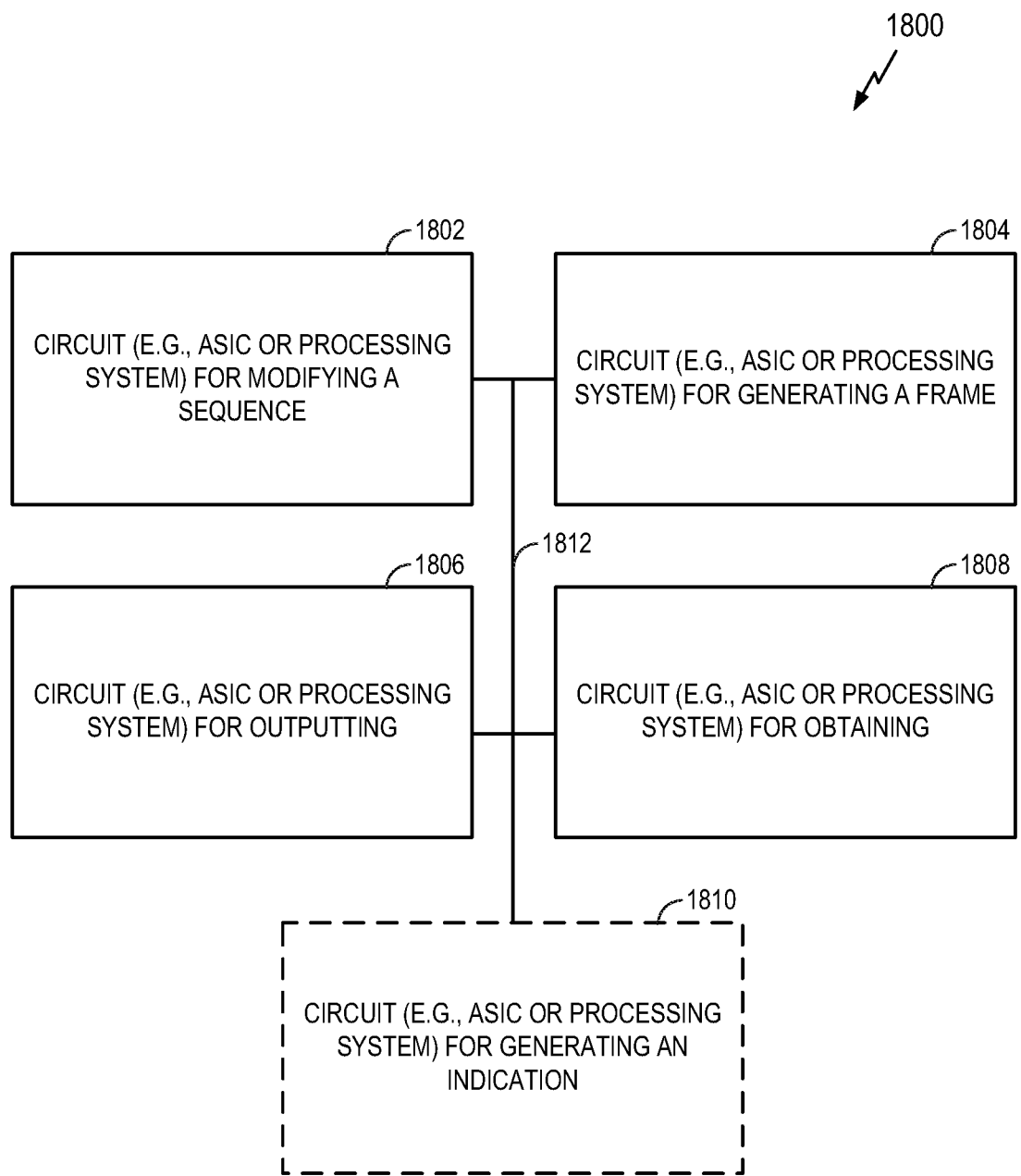
FIG. 18 is a simplified block diagram of several sample aspects of an apparatus configured with functionality in accordance with some aspects of the disclosure.
Figure 19:
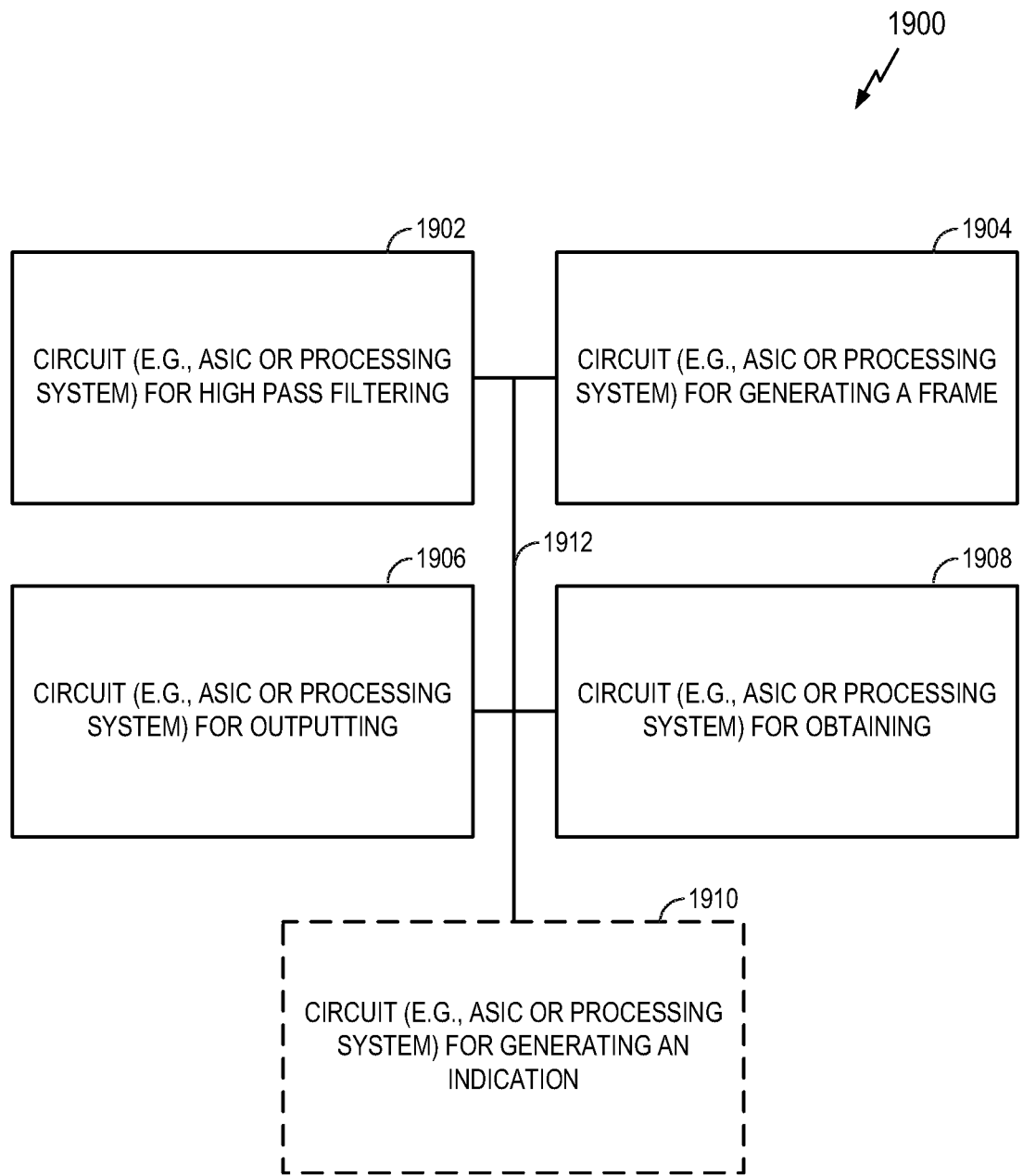
FIG. 19 is a simplified block diagram of several sample aspects of an apparatus configured with functionality in accordance with some aspects of the disclosure.

The components described herein may be implemented in a variety of ways. Referring to FIGS. 18 and 19, apparatuses 1800 and 1900 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 1800 includes one or more components (modules) that may perform one or more of the functions described herein with regard to various figures. For example, a circuit (e.g., an ASIC or processing system) for modifying a sequence 1802, e.g., a means for modifying, may correspond to, for example, a processing system as discussed herein. A circuit (e.g., an ASIC or processing system) for generating a frame 1804, e.g., a means for generating a frame, may correspond to, for example, a processing system as discussed herein. A circuit (e.g., an ASIC or processing system) for outputting 1806, e.g., a means for outputting, may correspond to, for example, an interface (e.g., a bus interface, a send/receive interface, or some other type of signal interface), a communication device, a transceiver, a transmitter, a processing system, or some other similar component as discussed herein. A circuit (e.g., an ASIC or processing system) for obtaining 1808, e.g., a means for obtaining, may correspond to, for example, an interface (e.g., a bus interface, a send/receive interface, or some other type of signal interface), a communication device, a transceiver, a receiver, a processing system, or some other similar component as discussed herein. A circuit (e.g., an ASIC or processing system) for generating an indication 1810, e.g., a means for generating an indication, may correspond to, for example, a processing system as discussed herein. Two or more of the modules of FIG. 18 may communicate with each other or some other component via a signaling bus 1812. In various implementations, the processing system 804 of FIG. 8 and/or the processing system 1104 of FIG. 11 may include one or more of the circuit for modifying a sequence 1802, the circuit for generating a frame 1804, the circuit for outputting 1806, the circuit for obtaining 1808, or the circuit for generating an indication 1810.

The apparatus 1900 includes one or more components (modules) that may perform one or more of the functions described herein with regard to various figures. For example, a circuit (e.g., an ASIC or processing system) for high pass filtering 1902, e.g., a means for high pass filtering, may correspond to, for example, a processing system as discussed herein. A circuit (e.g., an ASIC or processing system) for generating a frame 1904, e.g., a means for generating a frame, may correspond to, for example, a processing system as discussed herein. A circuit (e.g., an ASIC or processing system) for outputting 1906, e.g., a means for outputting, may correspond to, for example, an interface (e.g., a bus interface, a send/receive interface, or some other type of signal interface), a communication device, a transceiver, a transmitter, a processing system, or some other similar component as discussed herein. A circuit (e.g., an ASIC or processing system) for obtaining 1908, e.g., a means for obtaining, may correspond to, for example, an interface (e.g., a bus interface, a send/receive interface, or some other type of signal interface), a communication device, a transceiver, a receiver, a processing system, or some other similar component as discussed herein. A circuit (e.g., an ASIC or processing system) for generating an indication 1910, e.g., a means for generating an indication, may correspond to, for example, a processing system as discussed herein. Two or more of the modules of FIG. 19 may communicate with each other or some other component via a signaling bus 1912. In various implementations, the processing system 804 of FIG. 8 and/or the processing system 1104 of FIG. 11 may include one or more of the circuit for high pass filtering 1902, the circuit for generating a frame 1904, the circuit for outputting 1906, the circuit for obtaining 1908, or the circuit for generating an indication 1910.

The apparatus 2000 includes one or more components (modules) that may perform one or more of the functions described herein with regard to various figures. For example, a circuit (e.g., an ASIC or processing system) for obtaining 2002, e.g., a means for obtaining, may correspond to, for example, an interface (e.g., a bus interface, a send/receive interface, or some other type of signal interface), a communication device, a transceiver, a receiver, a processing system, or some other similar component as discussed herein. A circuit (e.g., an ASIC or processing system) for processing 2004, e.g., a means for processing, may correspond to, for example, a processing system as discussed herein. A circuit (e.g., an ASIC or processing system) for generating 2006, e.g., a means for generating, may correspond to, for example, a processing system as discussed herein. A circuit (e.g., an ASIC or processing system) for outputting 2008, e.g., a means for outputting, may correspond to, for example, an interface (e.g., a bus interface, a send/receive interface, or some other type of signal interface), a communication device, a transceiver, a transmitter, a processing system, or some other similar component as discussed herein. Two or more of the modules of FIG. 20 may communicate with each other or some other component via a signaling bus 2010. In various implementations, the processing system 804 of FIG. 8 and/or the processing system 1104 of FIG. 11 may include one or more of the circuit for obtaining 2002, the circuit for processing 2004, the circuit for generating 2006, or the circuit for outputting 2008.

As noted above, in some aspects these modules may be implemented via appropriate processor components. These processor components may, in some aspects, be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes in FIG. 18, 19, 20, or elsewhere may be optional.

As noted above, the apparatuses 1800, 1900, and 2000 may be implemented as one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 1800 may be implemented as a single device (e.g., with the circuit for modifying a sequence 1802, the circuit for generating a frame 1804, the circuit for outputting 1806, the circuit for obtaining 1808, or the circuit for generating an indication 1810, implemented as different sections of an ASIC). As another specific example, the apparatus 1800 may be implemented as several devices (e.g., with the circuit for modifying a sequence 1802, the circuit for generating a frame 1804, and the circuit for generating an indication 1810 implemented as one ASIC, and the circuit for outputting 1806 and the circuit for obtaining 1808 implemented as another ASIC).

Figure 20:
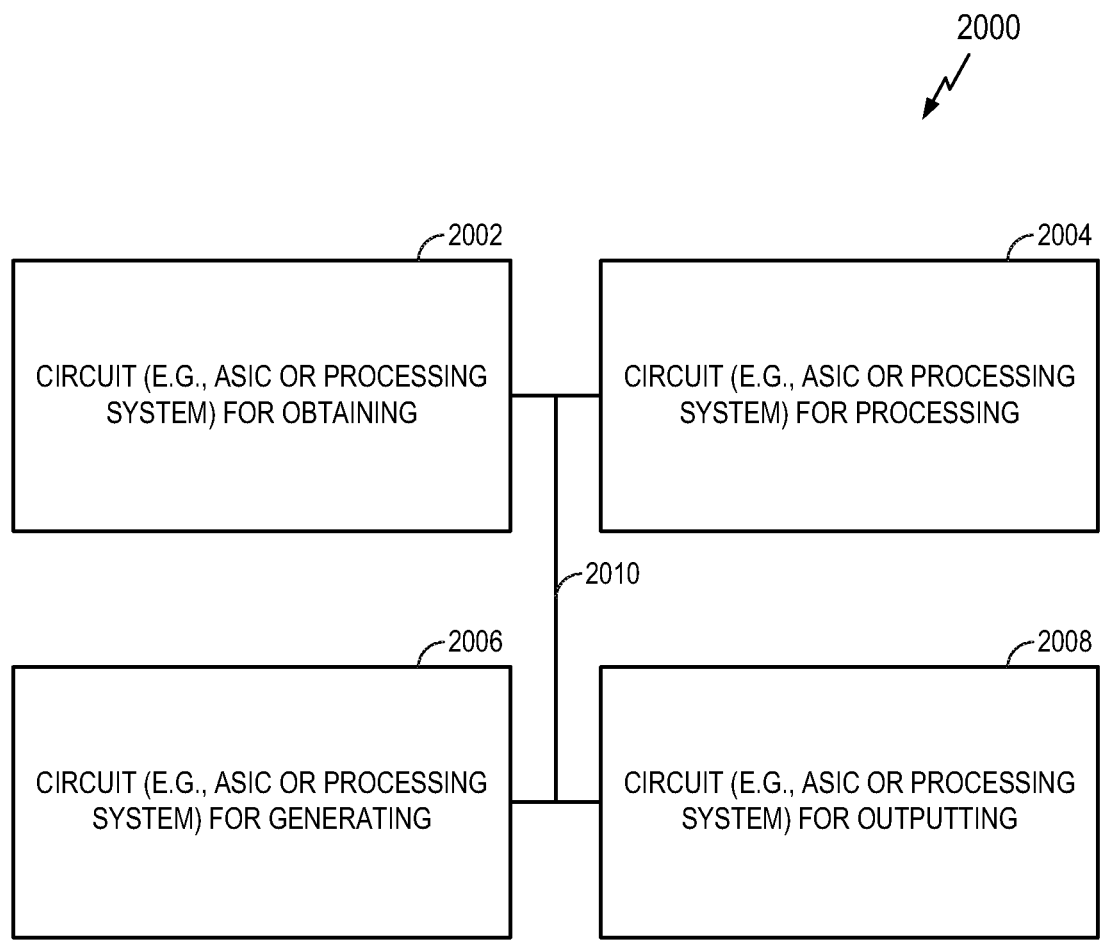
FIG. 20 is a simplified block diagram of several sample aspects of an apparatus configured with functionality in accordance with some aspects of the disclosure.

In addition, the components and functions represented by FIGS. 18, 19, and 20 as well as other components and functions described herein, may be implemented using any suitable means. Such means are implemented, at least in part, using corresponding structure as taught herein. For example, the components described above in conjunction with the "ASIC for" components of FIGS. 18, 19, and 20 correspond to similarly designated "means for" functionality. Thus, one or more of such means is implemented using one or more of processor components, integrated circuits, or other suitable structure as taught herein in some implementations. Several examples follow. A means for obtaining (e.g., a sequence, an indication, or other information) may determine where to obtain information (e.g., from a memory device, a receiver, some other component, or some other apparatus), process the information if needed, and output the information to an appropriate destination (e.g., a memory device, or some other component), and perform other related operations as described herein. A means for modifying may acquire information (e.g., a sequence modification parameter) upon which the modification is to be based (e.g., from a memory device or some other component), make the modification based on the information (e.g., apply gain or filtering to the sequence), output a result of the modification (e.g., to a memory device, a transmitter, or some other component), and perform other related operations as described herein. A means for high pass filtering may acquire information (e.g., a filter characteristic parameter) upon which the high pass filtering is to be based (e.g., from a memory device or some other component), perform the high pass filtering based on the information (e.g., apply filtering to the sequence), output a result of the high pass filtering (e.g., to a memory device, a transmitter, or some other component), and perform other related operations as described herein. A means for generating may acquire control information upon which the generation is to be based (e.g., from a memory device or some other component), generate the desired information (e.g., a frame or indication) based on the control information (e.g., determine which type of frame or indication to generate), output the generated result (e.g., to a memory device, a transceiver, or some other component), and perform other related operations as described herein. A means for outputting (e.g., a signal, or other information) may obtain information to be output (e.g., from a memory device or some other component), format the information if needed, send the information to an appropriate destination (e.g., a memory device, a transmitter, some other component, or some other apparatus), and perform other related operations as described herein.

The various operations of methods described herein may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar functionality and/or numbering. For example, the blocks of the process 1200 illustrated in FIG. 12 may correspond at least in some aspects, to corresponding blocks of the apparatus 1800 illustrated in FIG. 18. As another example, the blocks of the process 1300 illustrated in FIG. 13 may correspond at least in some aspects, to corresponding blocks of the apparatus 1900 illustrated in FIG. 19. As yet another example, the blocks of the processes 1400, 1500, 1600, or 1700 illustrated in FIG. 14, 15, 16, or 17 may correspond at least in some aspects, to corresponding blocks of the apparatus 2000 illustrated in FIG. 20.

Example Programming

Figure 21:
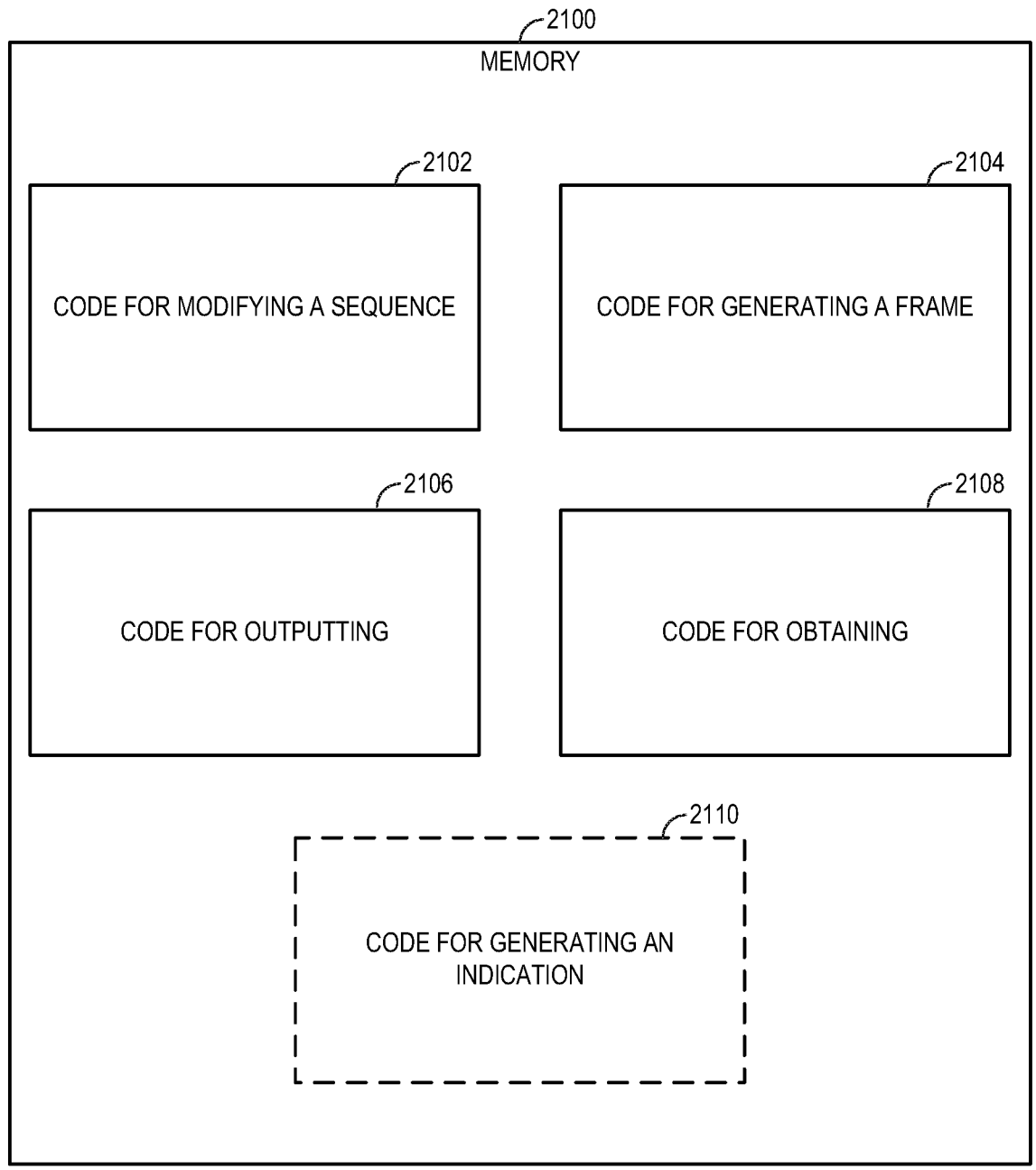
FIG. 21 is a simplified block diagram of several sample aspects of a memory configured with code in accordance with some aspects of the disclosure.
Figure 22:
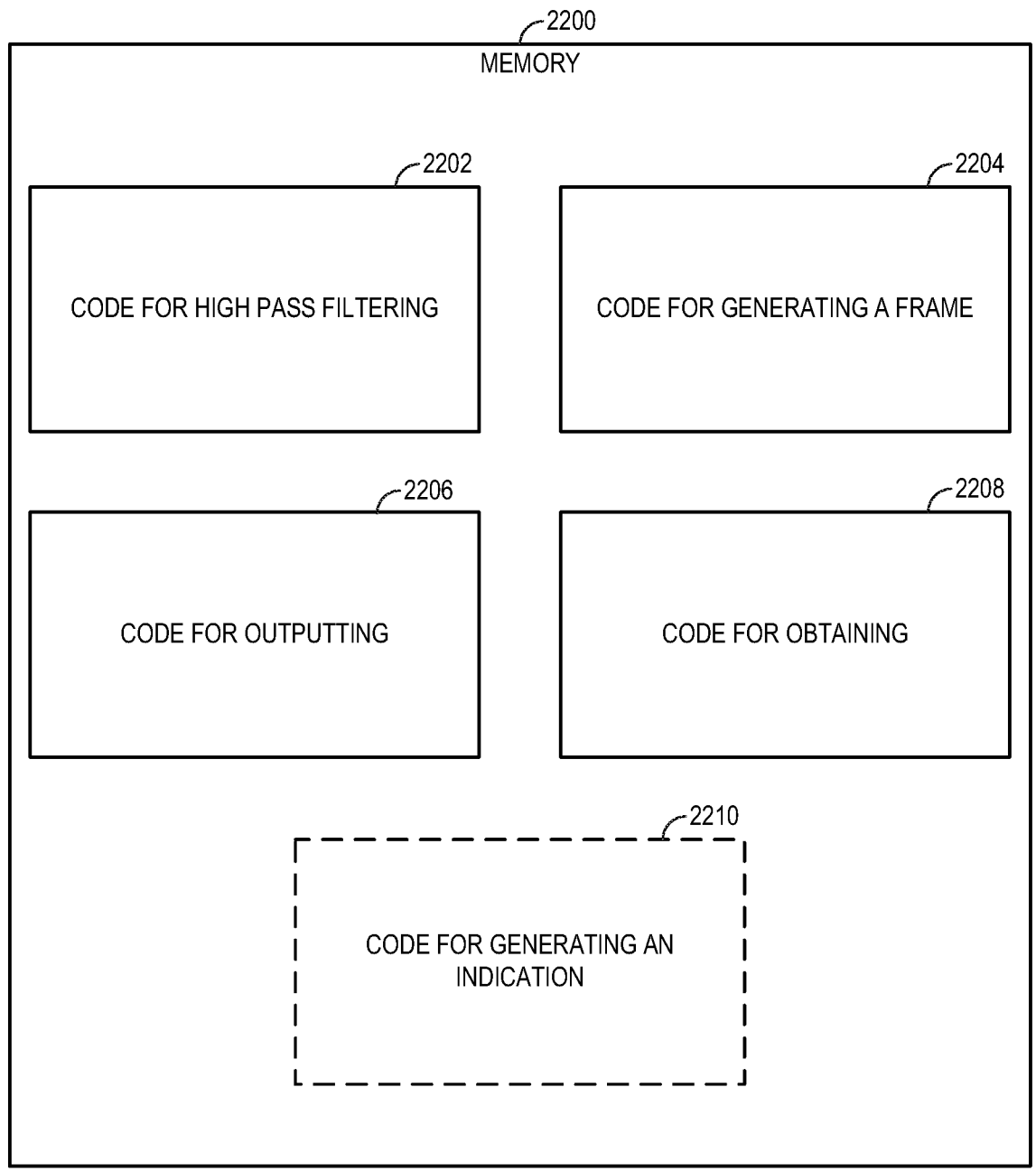
FIG. 22 is a simplified block diagram of several sample aspects of a memory configured with code in accordance with some aspects of the disclosure.
Figure 23:
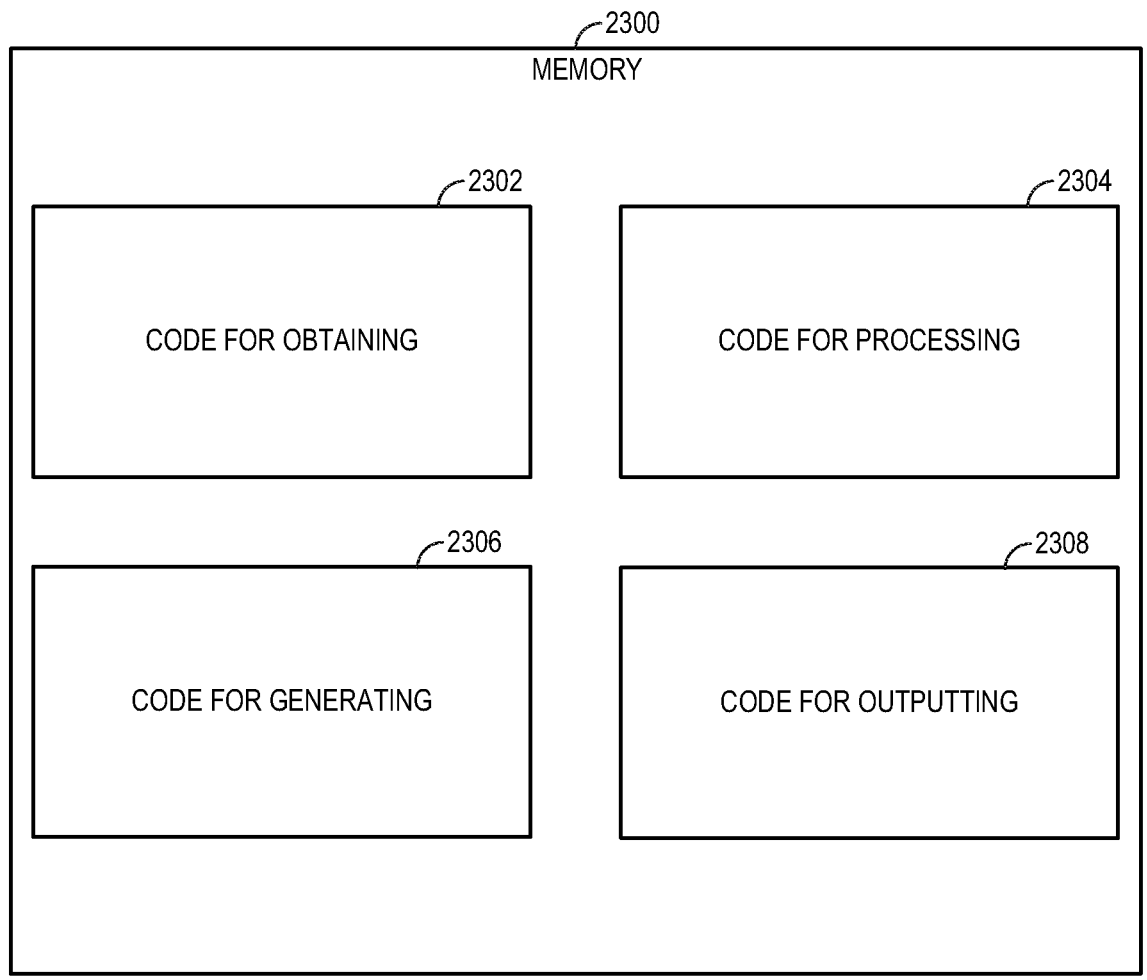
FIG. 23 is a simplified block diagram of several sample aspects of a memory configured with code in accordance with some aspects of the disclosure.

Referring to FIGS. 21, 22, and 23, programming stored by a memory a memory 2100, a memory 2200, or a memory 2300 (e.g. a storage medium, a memory device, etc.), when executed by a processing system (e.g., the processing system 1104 of FIG. 11), causes the processing system to perform one or more of the various functions and/or process operations described herein. For example, the programming, when executed by the processing system 1104, may cause the processing system 1104 to perform the various functions, steps, and/or processes described herein with respect to FIGS. 1-6 and 12-17 in various implementations.

As shown in FIG. 21, the memory 2100 may include one or more of code for modifying a sequence 2102, code for generating a frame 2104, code for outputting 2106, code for obtaining 2108, or code for generating an indication 2110. In some aspects, one of more of the code for modifying a sequence 2102, the code for generating a frame 2104, the code for outputting 2106, the code for obtaining 2108, or the code for generating an indication 2120 may be executed or otherwise used to provide the functionality described herein for the circuit for modifying a sequence 1802, the circuit for generating a frame 1804, the circuit for outputting 1806, the circuit for obtaining 1808, or the circuit for generating an indication 1810. In some aspects, the memory 2100 may correspond to the memory 1106 of FIG. 11.

As shown in FIG. 22, the memory 2200 may include one or more of code for high pass filtering 2202, code for generating a frame 2204, code for outputting 2206, code for obtaining 2208, or code for generating an indication 2210. In some aspects, one of more of the code for high pass filtering 2202, the code for generating a frame 2204, the code for outputting 2206, the code for obtaining 2208, or the code for generating an indication 2220 may be executed or otherwise used to provide the functionality described herein for the circuit for high pass filtering 1902, the circuit for generating a frame 1904, the circuit for outputting 1906, the circuit for obtaining 1908, or the circuit for generating an indication 1910. In some aspects, the memory 2200 may correspond to the memory 1106 of FIG. 11.

As shown in FIG. 23, the memory 2300 may include one or more of code for obtaining 2302, code for processing 2304, code for generating 2306, or code for outputting 2308. In some aspects, one of more of the code for obtaining 2302, the code for processing 2304, the code for generating a control signal 2306, or the code for outputting 2308 may be executed or otherwise used to provide the functionality described herein for the circuit for obtaining 2002, the circuit for processing 2004, the circuit for generating 2006, or the circuit for outputting 2008. In some aspects, the memory 2300 may correspond to the memory 1106 of FIG. 11.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein (e.g., computer-readable medium storing computer-executable code, including code to perform the functionality described herein). Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for communication, comprising:
an interface configured to obtain a sequence comprising pilot repetitions; and
a processing system configured to:
modify the sequence to provide a modified sequence, wherein the modification of the sequence comprises adjusting an amplitude of the sequence or applying a high pass filter to the sequence,
generate an indication that the sequence has been modified for at least one of gain estimation, linearity estimation, direct current leakage estimation, local oscillator leakage estimation, or any combination thereof, and
generate a frame comprising the modified sequence in at least a portion of a short training field of the frame,
wherein the interface is further configured to output the frame and the indication for transmission.

2. The apparatus of claim 1, wherein the frame conforms to the Institute of Electrical and Electronics Engineers (IEEE) 802.11ay wireless communication standard.

3. The apparatus of claim 1, wherein the short training field comprises an extended directional multi-gigabit short training field.

4. The apparatus of claim 1, wherein the adjusting the amplitude of the sequence comprises applying a plurality of gains to the sequence such that a first gain is applied to a first pilot repetition of the pilot repetitions and a second gain different from the first gain is applied to a second pilot repetition of the pilot repetitions.

5. The apparatus of claim 1, wherein the modified sequence comprises an amplitude modulated signal for linearity estimation.

6. The apparatus of claim 1, wherein the modified sequence comprises a high-pass filtered signal for leakage estimation.

7. The apparatus of claim 1, wherein the applying a high-pass filter to the sequence comprises eliminating frequency components of 4 MHz or less from the sequence.

8. The apparatus of claim 1, wherein the indication indicates at least one gain applied to at least one of the pilot repetitions of the sequence.

9. The apparatus of claim 1, wherein the indication indicates at least one signal type of the modified sequence.

10. The apparatus of claim 9, wherein the at least one signal type comprises: a gain estimation signal type, a linearity estimation signal type, a direct current leakage estimation signal type, a local oscillator leakage estimation signal type, or any combination thereof.

11. The apparatus of claim 1, wherein:
the processing system is further configured to generate the frame including the indication; and
the outputting of the frame for transmission comprises the outputting of the indication for transmission.

12. A wireless node, comprising:
an interface configured to obtain a sequence comprising pilot repetitions;
a processing system configured to:
modify the sequence to provide a modified sequence, wherein the modification of the sequence comprises adjusting an amplitude of the sequence or applying a high pass filter to the sequence,
generate an indication that the sequence has been modified for at least one of gain estimation, linearity estimation, direct current leakage estimation, local oscillator leakage estimation, or any combination thereof, and generate a frame comprising the modified sequence in at least a portion of a short training field of the frame; and a transmitter configured to transmit the frame and the indication.

13. An apparatus for communication, comprising:

an interface configured to obtain a frame that includes a sequence comprising pilot repetitions in at least a portion of a short training field of the frame and to obtain an indication that the sequence has been modified for at least one of gain estimation, linearity estimation, direct current leakage estimation, local oscillator leakage estimation, or any combination thereof wherein the modification of the sequence comprises an adjustment of an amplitude of the sequence or an application of a high pass filter to the sequence; and a processing system configured to:
process the sequence based on the indication to determine at least one communication parameter, and
generate a signal to control an operation based on the at least one communication parameter,
wherein the interface is further configured to output the signal.

14. The apparatus of claim 13, wherein the frame conforms to the Institute of Electrical and Electronics Engineers (IEEE) 802.11ay wireless communication standard.

15. The apparatus of claim 13, wherein the at least one communication parameter comprises: gain, linearity, direct current leakage, local oscillator leakage, phase noise, noise, interference, or any combination thereof.

16. The apparatus of claim 13, wherein the determination of the at least one communication parameter comprises determining leakage associated with transmission of the frame.

17. The apparatus of claim 13, wherein the determination of the at least one communication parameter comprises determining phase noise associated with transmission of the frame.

18. The apparatus of claim 17, wherein:
the interface is further configured to obtain an indication that the sequence can be used for the determination of the phase noise; and
the processing system is further configured to process the sequence based on the indication.

19. The apparatus of claim 13, wherein the determination of the at least one communication parameter comprises determining noise or interference associated with transmission of the frame.

20. The apparatus of claim 19, wherein:
the interface is further configured to obtain another indication that the sequence can be used for the determination of the noise or interference; and
the processing system is further configured to process the sequence based on the other indication.

21. The apparatus of claim 13, wherein the operation comprises: channel estimation, equalization, decimation, frequency correlation, compression, phase lock loop tracking, backoff of dynamic range, or any combination thereof.

22. The apparatus of claim 13, wherein the at least one communication parameter comprises a plurality of gains applied to the sequence including a first gain applied to a first pilot repetition of the pilot repetitions and a second gain different from the first gain applied to a second pilot repetition of the pilot repetitions.

23. The apparatus of claim 13, wherein the indication indicates at least one gain applied to at least one of the pilot repetitions of the sequence.

24. The apparatus of claim 13, wherein the indication indicates at least one high pass filter characteristic applied to the sequence to eliminate frequency components of 4 MHz or less from the sequence.

25. The apparatus of claim 13, wherein the indication indicates at least one signal type of the sequence.

26. The apparatus of claim 25, wherein the at least one signal type comprises: a gain estimation signal type, a linearity estimation signal type, a direct current leakage estimation signal type, a local oscillator leakage estimation signal type, or any combination thereof.

27. The apparatus of claim 13, further comprising:
a receiver configured to receive the frame,
wherein the apparatus is configured as a wireless node.

28. The apparatus of claim 13, wherein:
the processing of the sequence comprises estimating a transfer function based on the adjustment of the amplitude.

29. The apparatus of claim 13, wherein:
the processing of the sequence comprises estimating a power of a leakage component of the modified sequence based on the application of the high pass filter to the sequence.

* * * * *